United States Patent
Tomita et al.

(10) Patent No.: US 7,058,088 B2
(45) Date of Patent: Jun. 6, 2006

(54) DATA COMMUNICATION PROGRAM PRODUCT TO REWRITE SIMULTANEOUSLY FIRMWARE OF PLURALITY OF DEVICES CONNECTED TO NETWORK

(75) Inventors: Atsushi Tomita, Toyohashi (JP); Hideki Hino, Toyokawa (JP); Hideo Mae, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 1017 days.

(21) Appl. No.: 10/103,882

(22) Filed: Mar. 25, 2002

(65) Prior Publication Data

US 2002/0141419 A1  Oct. 3, 2002

(30) Foreign Application Priority Data

Mar. 28, 2001 (JP) .............................. 2001-092583
Mar. 28, 2001 (JP) .............................. 2001-092584

(51) Int. Cl.
*H04J 1/00* (2006.01)
(52) U.S. Cl. ........................ 370/490; 709/203; 717/173
(58) Field of Classification Search ................ 370/282, 370/466, 490; 710/36; 709/203; 717/173
See application file for complete search history.

(56) References Cited

U.S. PATENT DOCUMENTS 6,151,643 A * 11/2000 Cheng et al. ................. 710/36

FOREIGN PATENT DOCUMENTS

| JP | 4-54634 | 2/1992 |
|----|---------|--------|
| JP | 07-295943 | 11/1995 |
| JP | 9-73390 | 3/1997 |
| JP | 09-282170 | 10/1997 |
| JP | 11-282779 | 10/1999 |
| JP | 2000-029648 | 1/2000 |
| JP | 2000-155683 | 6/2000 |
| JP | 2000-261579 | 9/2000 |
| JP | 2000-267857 | 9/2000 |
| JP | 2000-330917 | 11/2000 |
| JP | 2001-056753 | 2/2001 |
| JP | 2001-067278 | 3/2001 |
| JP | 2001-067279 | 3/2001 |

* cited by examiner

*Primary Examiner*—John Pezzlo
(74) *Attorney, Agent, or Firm*—Buchanan Ingersoll PC

(57) ABSTRACT

New firmware is attached to electronic mail from a computer of the service center to be transmitted towards a monitor device at the user side. The monitor device of the user side reads out the electronic mail from a mail server and downloads the electronic mail into its own apparatus. Then, the firmware is derived from the electronic mail and transmitted to an image formation apparatus that is the subject of transmission. The image formation apparatus receiving the firmware writes the new firmware into the flash ROM that is the subject of rewriting. Accordingly, increase of the communication traffic can be prevented and the load on the mail server can be alleviated in the case where the same firmware for a plurality of devices connected on a network is to be altered using an electronic mail system.

25 Claims, 20 Drawing Sheets

F I G. 7

| No. | MACHINE TYPE | ELECTRONIC MAIL ADDRESS | OTHER INFORMATION... |
|-----|--------------|-------------------------|----------------------|
| 1   | mdel1        | mngr1@customer1.com     | ...                  |
| 2   | mdel1        | mngr1@customer1.com     | ...                  |
| 3   | mdel2        | mngr1@customer1.com     | ...                  |
| 4   | mdel1        | mngr1@customer2.com     | ...                  |
| ..  | ..           | ..                      | ..                   |

F I G. 1 1

| No. | MACHINE TYPE | IP ADDRESS | OTHER INFORMATION... |
|---|---|---|---|
| 1 | mdel1 | 192.168.0.1 | ... |
| 2 | mdel1 | 192.168.0.2 | ... |
| 3 | mdel2 | 192.168.0.3 | ... |
| 4 | mdel3 | 192.168.0.4 | ... |
| .. | .. | .. | .. |

F I G. 1 6
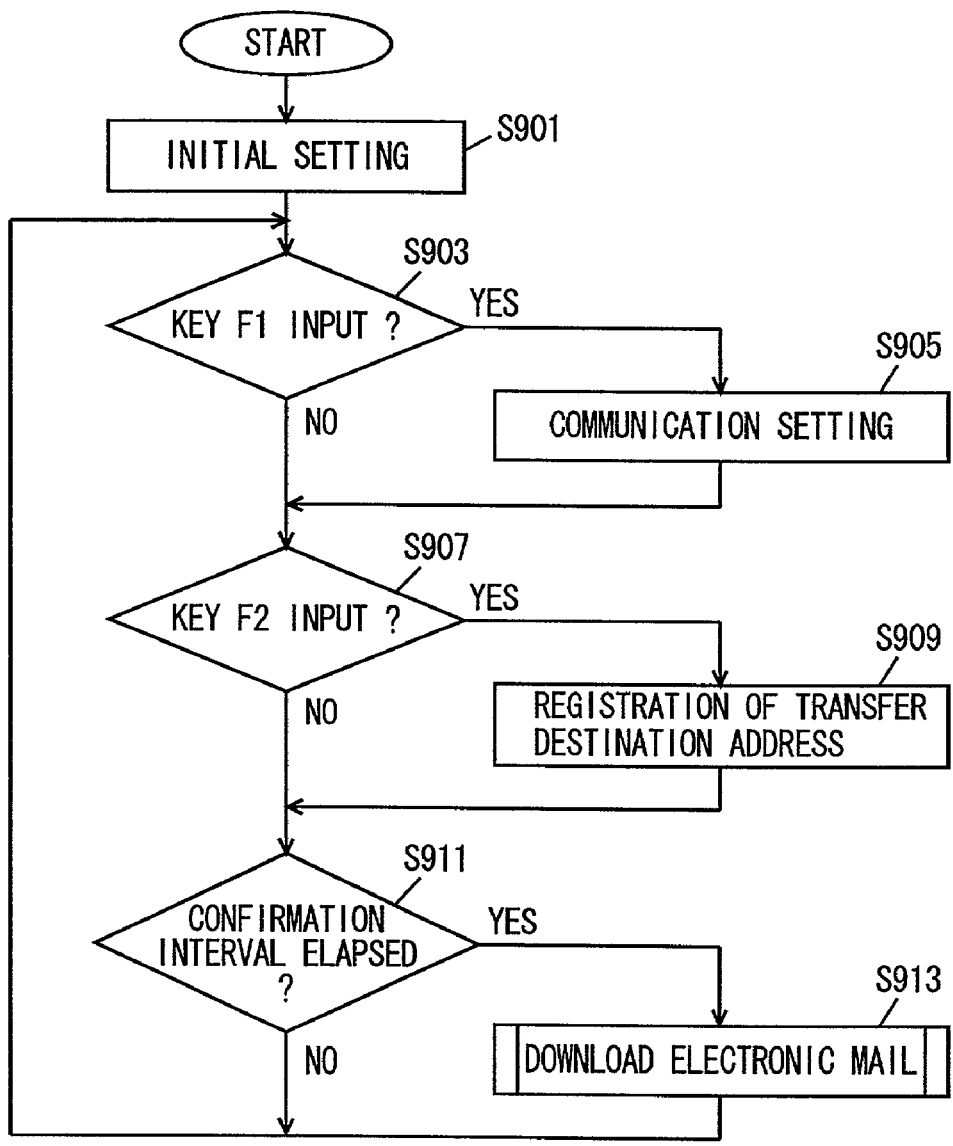

FIG. 17

| No. | MACHINE TYPE | IP ADDRESS | OTHER INFORMATION... |
|---|---|---|---|
| 1 | mdel1 | 192.168.0.1 | ... |
| 2 | mdel1 | 192.168.0.2 | ... |
| 3 | mdel1 | 192.168.0.3 | ... |
| 4 | mdel1 | 192.168.0.4 | ... |
| .. | .. | .. | .. |

DATA COMMUNICATION PROGRAM PRODUCT TO REWRITE SIMULTANEOUSLY FIRMWARE OF PLURALITY OF DEVICES CONNECTED TO NETWORK

This application is based on applications Nos. 2001-92583 and 2001-92584 filed in Japan, the contents of which are hereby incorporated by reference.

BACKGROUND OF THE INVENTION

1. Field of the Invention

The present invention relates to a program product for data communication, a computer-readable recording medium in which a data communication program is recorded, a data communication apparatus, and a data communication method. More particularly, the present invention relates to a data communication program product that can alleviate communication traffic even in the case where the firmware of a plurality of devices connected to, for example, a LAN (Local Area Network), is to be rewritten at the same time, a computer-readable recording medium in which a data communication program is recorded, a data communication apparatus and a data communication method 2. Description of the Related Art The firmware controlling the operation of, for example, an image formation apparatus is conventionally written into a mask ROM (Read Only Memory). When the firmware has to be exchanged, the method is taken of replacing the mask ROM on the control board in the image formation apparatus with a mask ROM written with new firmware.

The exchange of a mask ROM is time-consuming and complicated. Therefore, a rewritable flash ROM is used instead of a mask ROM to improve the workability.

Methods set forth below have been taken to exchange the firmware written in a flash ROM.

As the first method, the method of using an external storage device such as a memory card is known. An I/F (interface) with an external storage device such as a memory card is provided in the image formation apparatus. A memory card with the new firmware is connected to that I/F. Then, the new firmware is written from the memory card to the flash ROM. In rewriting the firmware, remote operation is not possible. The operation must be carried out actually at the site where the image formation apparatus is installed.

A method of utilizing a public switched network is known as the second method. This method is adapted to practical usage mainly in the field of facsimile apparatuses. Specifically, firmware is transmitted to an image formation apparatus from a remote apparatus connected to the public switched network. By downloading the transmission, the firmware is rewritten. Although there is no need to be actually present at the site as in the first method, the communication cost is high. Also, downloading the firmware is relatively time-consuming.

Reflecting the spread of the Internet, downloading the firmware through the Internet instead of through the public switched network is taken as the third method. The usage of the Internet allows reduction in the cost of transmission and the time required to download the firmware.

There are various protocols for communication through the Internet such as an HTTP (Hyper Text Transfer Protocol) to view a home page, an FTP (File Transfer Protocol) to transfer a file, an SMTP (Simple Mail Transfer Protocol) used in the communication of electronic mail, and the like. However, the protocol to download the firmware from a remote station to an image formation apparatus through the Internet is limited from the standpoint of security on the communication through the Internet.

Specifically, a firewall generally functioning as a "barrier" is provided at the connection of the Internet and each user to cope with illegal access and the like from the Internet to the user's internal system. The firewall has the capability to control the communication protocol that can be passed between the Internet and the internal system of the user. Accordingly, the passable protocol is limited. The protocol of electronic mail is generally set as passable. Therefore, the conventional electronic mail system is employed in transmitting firmware via the Internet.

The above third method, i.e., the method of transmitting firmware utilizing an electronic mail system has the possibility of increasing the communication traffic of the Internet and the LAN as well as the load on the mail server. No measures have been taken to cope with these issues.

For example, consider the case where one user possessing a plurality of image formation apparatuses of the same type is to alter the firmware in these image formation apparatuses simultaneously. In the conventional firmware transmission method, the same firmware must be transmitted individually to each image formation apparatus.

The size of the firmware in an image formation apparatus has now become as big as approximately 10 Mbytes in accordance with the high function and multi-feature thereof. It is expected that the size of the firmware will further increase in the future.

This means that multiple transmission of firmware of such large size will significantly increase the communication traffic of the Internet as well as the LAN on both the transmission and receiver sides. Also, the load on the mail server for both the transmission and receiver sides is great.

SUMMARY OF THE INVENTION

In view of the foregoing, an object of the present invention is to provide a data communication program product that can prevent communication traffic from increasing and that can reduce the load on the mail server in the case where the same firmware is to be altered for a plurality of devices connected to a network using an electronic mail system, a computer-readable recording medium in which such a program is recorded, a data communication apparatus and a data communication method.

To achieve the above object, a program product for data communication according to an aspect of the present invention causes a computer to execute: a registration step of registering the address and predetermined information of a plurality of devices capable of data communication through a first network on a memory in correspondence with each device, an acquirement step of acquiring electronic mail sent through a second network, a storage step of storing the acquired electronic mail, a first derive step of deriving firmware from the stored electronic mail, a second derive step of deriving information to identify a device from the stored electronic mail, an identification step of referring to the memory based on the information derived at the second derive step to identify a plurality of target devices from the plurality of devices, and a transmission step of transmitting through the first network the derived firmware to the identified device.

According to the present invention, the address and predetermined information of a plurality of devices connected to a first network such as a LAN are registered on a memory in correspondence with each device. Electronic mail with firmware attached, transmitted through a second network such as the Internet, is acquired and stored. The firmware is derived from the stored electronic mail. Also, the information to identify a device is extracted. The memory is referred to based on the information to identify the device, and the device that is the target of transmission is identified from a plurality of devices. Then, the firmware is transmitted towards the address of the identified device through the first network.

According to another aspect of the present invention, a program product for data communication causes a computer to execute: a registration step of registering the network address of a data communication apparatus connected to a first network, an acquirement step of acquiring electronic mail with firmware attached, transmitted via a second network, a derive step of deriving the attached firmware from the acquired electronic mail, a write step of writing the derived firmware into the memory that is the target of rewriting, a transmission step of transmitting via the first network the attached firmware towards the registered network address of a plurality of communication apparatuses.

According to the present invention, the network address of a data communication apparatus connected to the first network such as the LAN, besides its own apparatus, is registered. When electronic mail with firmware attached sent from a second network such as the Internet is acquired, firmware is derived from the acquired electronic mail. The derived firmware is written into the memory that is the target of rewriting. Then, the attached or derived firmware is transmitted via the first network towards the data communication apparatus registered in the registration step.

According to a further aspect of the present invention, a program product for data communication causes a computer to execute: a registration step of registering the network address of a data communication apparatus connected to a first network, an acquirement step of acquiring electronic mail with firmware attached sent via the second network, a derive step of deriving the attached firmware from the acquired electronic mail, a transmission step of transmitting the derived firmware to a module that is the target of rewriting, a reception step of receiving a signal indicating whether writing of the transmitted firmware has succeeded or not, and a transfer step of transferring, when determination is made based on the signal that writing has succeeded, the derived firmware to the registered network address of the data communication apparatus via the first network.

According to the present invention, the network address of a data communication apparatus connected to the first network such as a LAN other than the target apparatus of control is registered. When electronic mail with firmware attached transmitted via the second network such as the Internet is acquired, the firmware is derived from the acquired electronic mail. The derived firmware is transmitted to the module of the target apparatus of control that is the subject of rewriting. A signal is received from the target apparatus of control indicating whether firmware writing has succeeded or not. When determination is made based on the received signal that writing has succeeded, the firmware is transmitted through the first network to the address of the data communication apparatus registered at the registration step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows an example of data registered on a fixed storage device 904 in a registration process (step S609) of the image formation apparatus of FIG. 6.

FIG. 11 shows an example of a registration table of an image formation apparatus stored in a fixed storage device 404 of monitor device 41.

FIG. 16 is a flow chart of the main routine of a process carried out by a CPU 201 of a printer controller 21 of image formation apparatus 11 that is the parent apparatus.

FIG. 17 shows an example of a registration table of an image formation apparatus stored in a fixed storage device 204 of printer controller 21 of image formation apparatus 11.

DESCRIPTION OF THE PREFERRED EMBODIMENTS

First Embodiment

A first embodiment of the present invention will be described in detail hereinafter with reference to the drawings.

Figure 1:
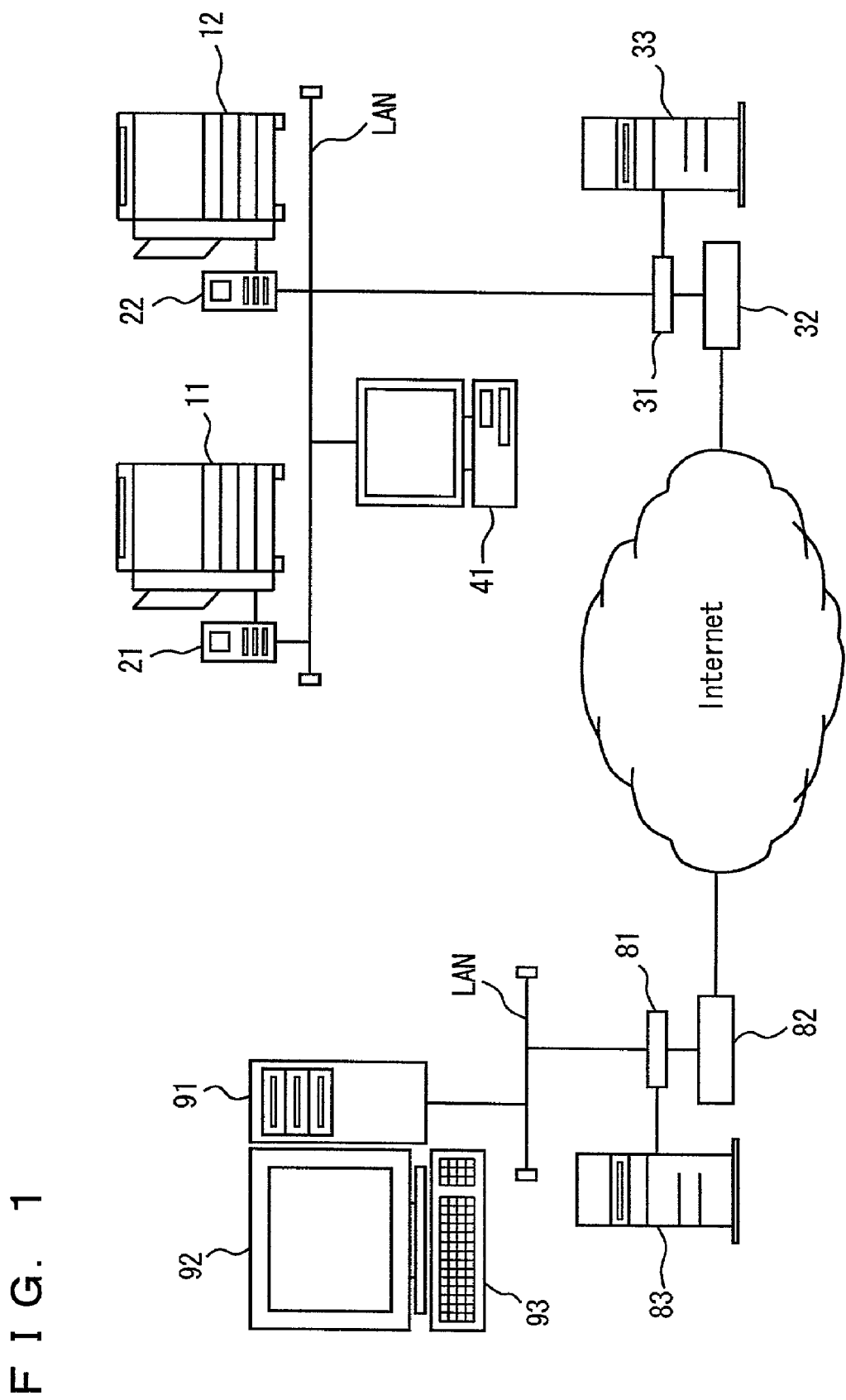
FIG. 1 shows a system structure to implement a rewriting method of firmware according to a first embodiment of the present invention.

Here, the case where firmware of an image formation apparatus is rewritten utilizing an electronic mail system will be described. Referring to FIG. 1, the present system is constituted by an apparatus of the user side including a plurality of image formation apparatuses, an apparatus of a service center side to transmit firmware to an image formation apparatus, and the Internet providing connection therebetween.

In the present system, the apparatus (set) of a plurality of users of the user side can be connected to the apparatus of one service center side. For the sake of simplification, the present embodiment corresponds to connection of apparatuses of one user (set).

At the user side, there are provided a plurality of image formation apparatuses 11 and 12, printer controllers 21 and 22 connected to respective image formation apparatuses, and a monitor device 41 monitoring globally the operation of the plurality of image formation apparatuses.

Printer controllers 21 and 22 and monitor device 41 are connected to a firewall 31 via the LAN, and further connected to the Internet via a router 32. A mail server 33 to compile electronic mail and carry out distribution service is connected to the LAN.

At the service center side, a computer 91 to transmit firmware is installed. Computer 91 is connected to a firewall 81 through the LAN and to the Internet through a router 82 to establish communication with user's monitor device 41. A mail server 83 to compile electronic mail and provide distribution service is connected to the LAN.

The operation of rewriting firmware will be described briefly here. First, new firmware is attached to electronic mail and transmitted from computer 91 of the service center side towards monitor device 41 at the user side. The electronic mail with firmware attached passes through the LAN of the service center side, mail server 83, the Internet, and the LAN of the user side to be stored in the mail box of mail server 33.

User's monitor device 41 reads out the electronic mail from mail server 33 and downloads the electronic mail into its own device. Then, firmware is derived from the electronic mail and transmitted via the LAN to an image formation apparatus that is the target of transmission. The image formation apparatus receiving the firmware writes the new firmware into the flash ROM that is the target of rewriting.

Respective apparatuses in FIG. 1 will be described in detail here. With regards to the plurality of image formation apparatuses and printer controllers, image formation apparatus 11 and printer controller 21 will be described as representatives thereof.

Figure 2:
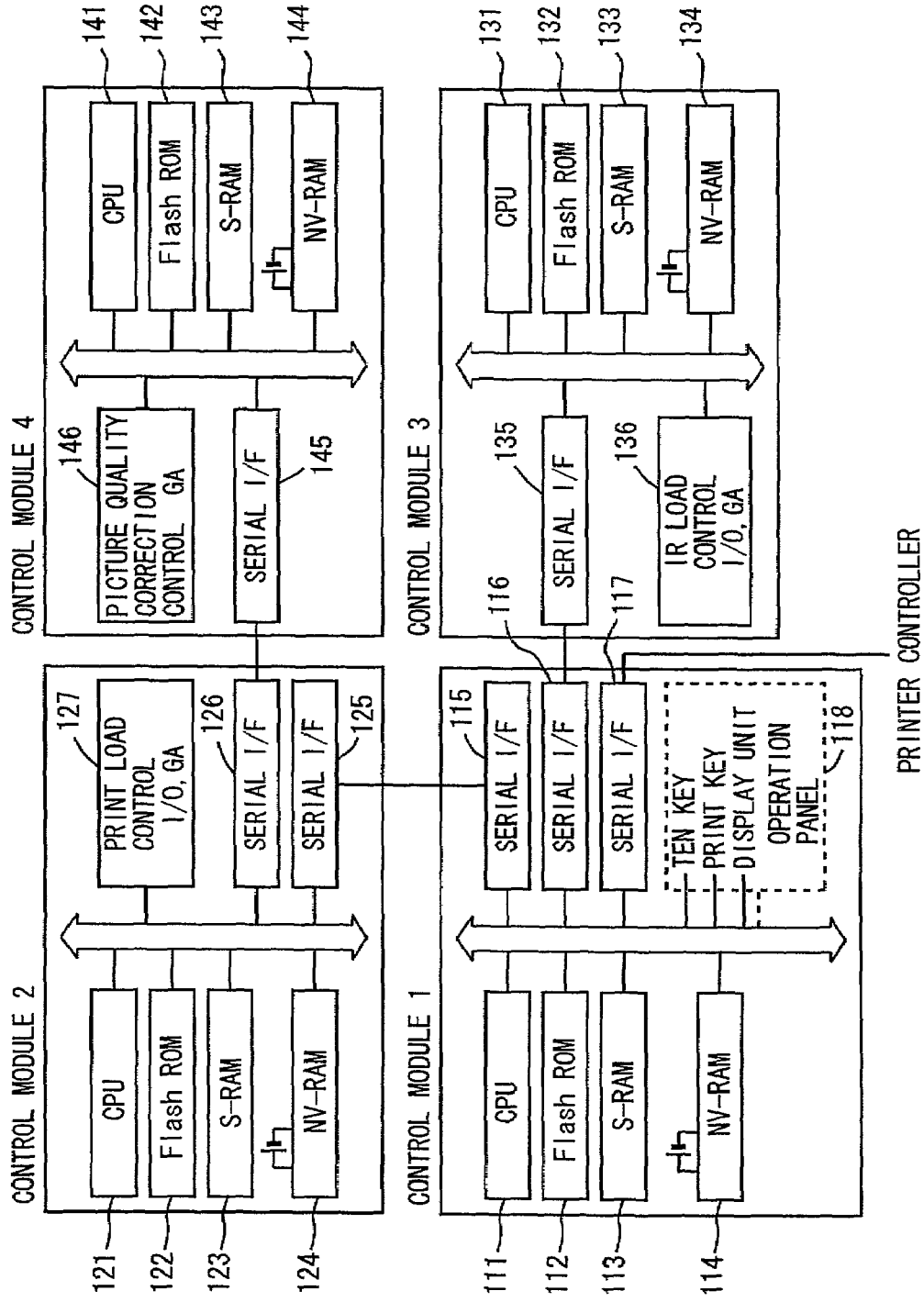
FIG. 2 is a block diagram showing a circuit structure of an image formation apparatus 11.

FIG. 2 is a block diagram of a circuit structure of image formation apparatus 11. Referring to FIG. 2, image formation apparatus 11 is an apparatus of a multi CPU (Central Processing Unit) configuration to scan a document image and form a copy image on a sheet. Image formation apparatus 11 is constituted by four control modules, i.e., a control module 1—a control module 4, corresponding to each CPU.

Control module 1 includes a CPU 111 providing overall control of image formation apparatus 11, a rewritable flash ROM 112 stored with firmware, an S-RAM 113 that is a working region, an NV-RAM 114 with battery-backup for storing various set values, a serial I/F 115 transmitting/receiving various control data to/from control module 2, a serial I/F 116 transmitting/receiving various control data to/from control module 3, a serial I/F 117 transmitting/receiving various data to/from printer controller 2, and an operation panel 118 with various keys and displays.

Control module 2 includes a CPU 121 controlling the print process of image formation apparatus 11, a rewritable flash ROM 122 having firmware stored therein, a S-RAM 123 that is a working area, an NV-RAM 124 with battery-backup for storing various setting values, a serial I/F 125 transmitting/receiving various control data to/from control module 1, a serial I/F 126 transmitting/receiving various control data to/from control module 4, and a print load control I/O, GA 127 controlling the load of an image formation apparatus.

Control module 3 includes a CPU 131 controlling the read process of a document image in image formation apparatus 11, a rewritable flash ROM 132 in which firmware is stored, a S-RAM 133 that is a working area, a NV-RAM 134 with battery-backup for storing various set values, a serial I/F 135 transmitting/receiving various control data to/from control module 1, and an IR load control I/O, GA 136 controlling the load of the read processes of a document image.

Control module 4 includes a CPU 141 controlling the correction of the picture quality for image formation apparatus 11, a rewritable flash ROM 142 in which firmware is stored, a S-RAM 143 that is a working area, a NV-RAM 144 with battery-backup for storing various set values, a serial I/F 145 transmitting/receiving various control data to/from control module 2, and a picture quality correction control GA 146 providing picture quality correction control.

Figure 3:
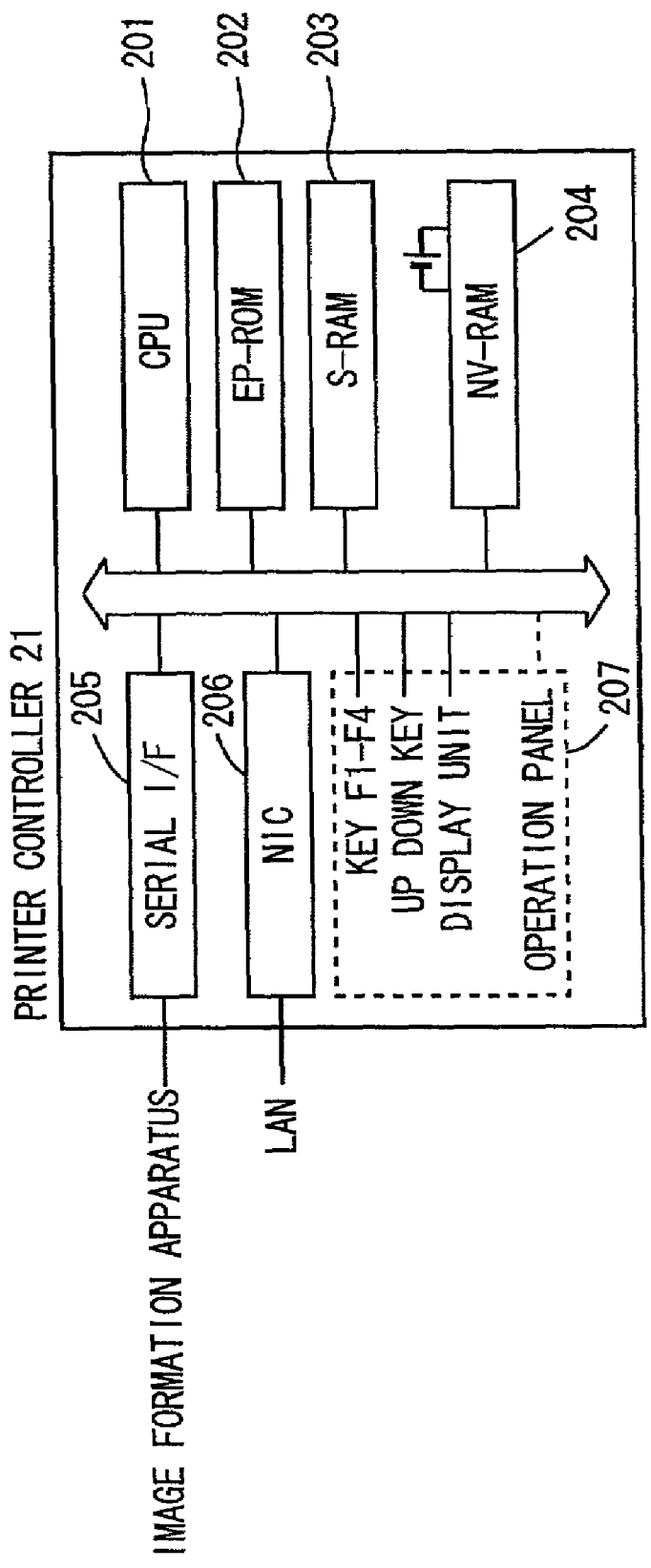
FIG. 3 is a block diagram of a circuit structure of a printer controller 21.

FIG. 3 is a block diagram of a circuit structure of printer control 21. Referring to FIG. 3, printer controller 21 includes a CPU 201, an EPROM 202 in which the control program thereof is stored, an S-RAM 203 that is a working area, a NV-RAM (non-volatile memory) 204 storing various set values, a serial I/F 205 transmitting/receiving various data to/from image formation apparatus 11, an NIC (Network Interface Card) 206 to transmit/receive various data through the LAN, and an operation panel 207 to set various operations.

NV-RAM 204 stores, in addition to its own IP address, the mail server IP address required for printer controller 21 to download from mail server 33 an electronic mail message addressed to itself, the name and password of its own electronic mail account, as well as the network address of another image formation apparatus 11 connected to the LAN and the like.

Figure 4:
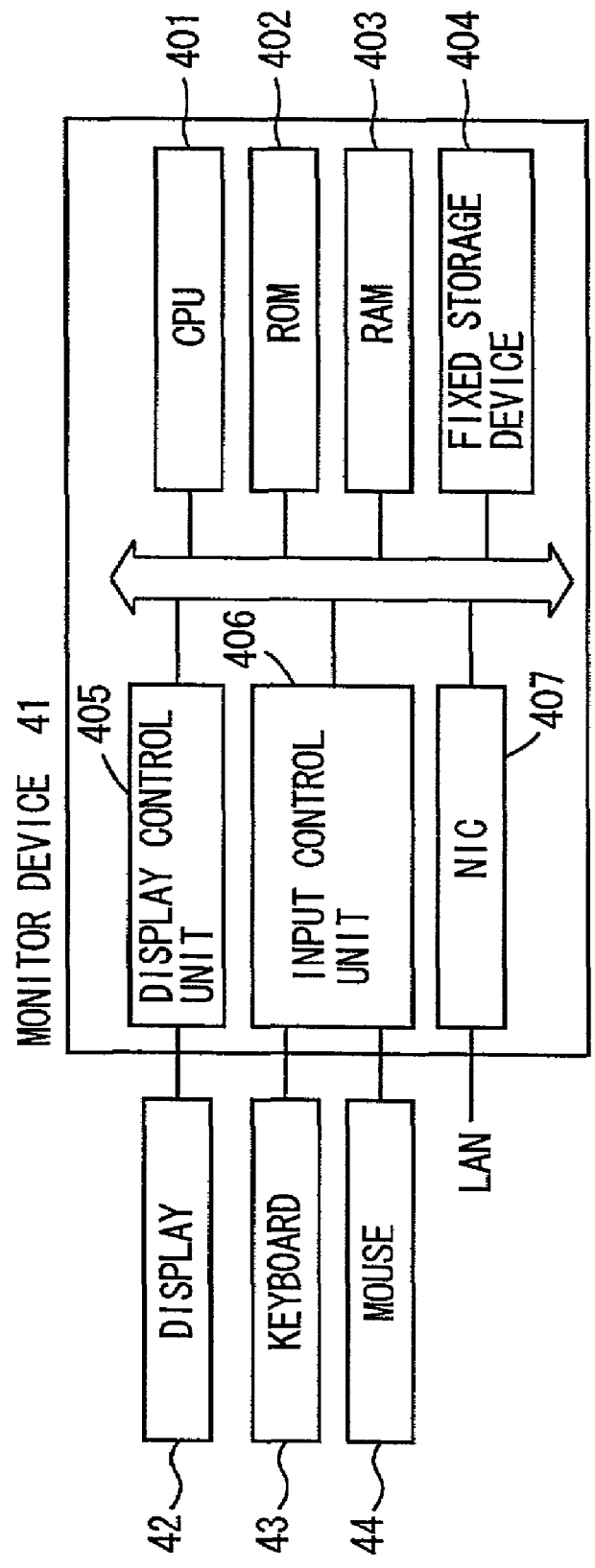
FIG. 4 is a block diagram of a circuit structure of a monitor device 41.

FIG. 4 is a block diagram of a circuit structure of monitor device 41. Referring to FIG. 4, monitor device 41 includes a CPU 401 providing entire control of the apparatus, a ROM 402 in which program and the like are stored, a RAM 403 that is the working area of CPU 401, and where various data are stored temporarily, a fixed storage device 404 in which various information are stored, a display control unit 405 controlling a display 24, an input control unit 406 providing the control of a keyboard 43 and a mouse 44, and an NIC 407 to carry out data transmission/reception with an external source connected to the LAN.

Fixed storage device 404 stores registration information of an image formation apparatus including the machine type of image formation apparatuses 11 and 21 whose operating status is to be monitored, and respective IP addresses.

Figure 5:
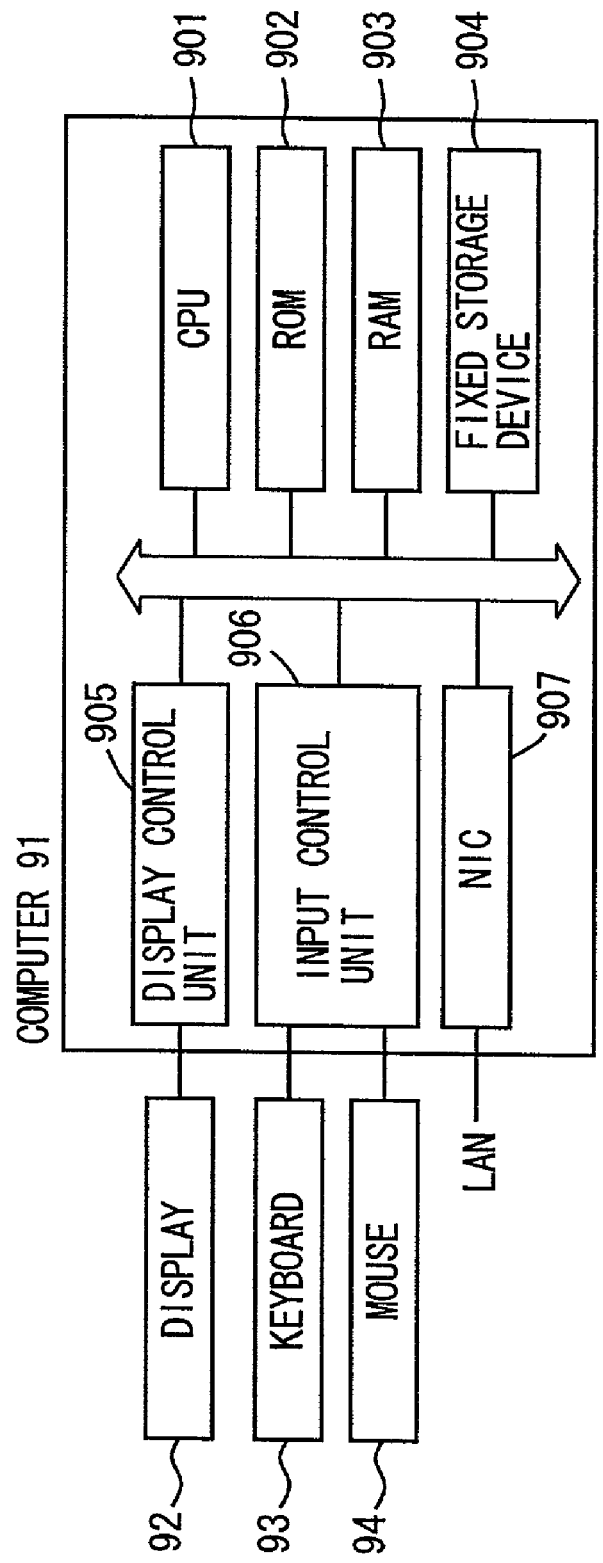
FIG. 5 is a block diagram of a circuit structure of a computer 91 installed at the service center side.

FIG. 5 is a block diagram of a circuit structure of computer 91 installed at the service center side. Referring to FIG. 5, computer 91 includes a CPU 901 providing overall control of the apparatus, a ROM 902 in which a program and the like are stored, a RAM 903 that is a working area and the region where various data are temporarily stored, a fixed storage device 904 in which various information and the like are stored, a display control unit 905 controlling a display 92, an input control unit 906 controlling a keyboard 93 and a mouse 94, and a NIC (Network Interface Card) 907 to transmit/receive various data with an external source via the LAN.

Fixed storage device 904 stores registration information of an image formation apparatus including the type of image formation apparatuses 11 and 12, and the electronic mail address of monitor device 41 monitoring the operation of image formation apparatuses 11 and 12. Also, the firmware of image formation apparatuses 11 and 12 is stored.

An operator at the service center prestores the firmware in a predetermined different folder/directory in fixed storage device 904 according to the machine type and control module thereof.

The operation of rewriting the firmware in an image formation apparatus from a remote station according to the system of FIG. 1 will be described hereinafter.

The process carried out at CPU 901 mounted in computer 91 of the service center will be described with reference to FIGS. 6–9.

Figure 6:
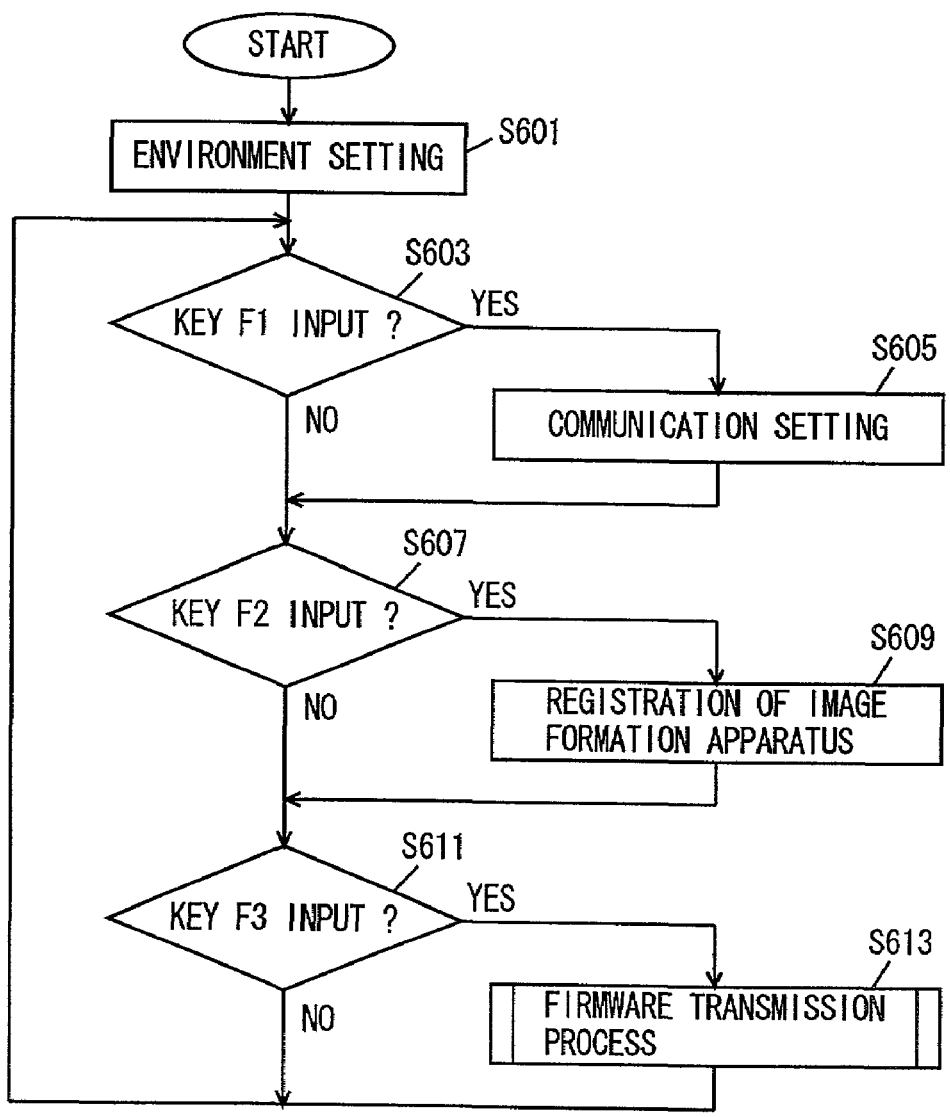
FIG. 6 is a flow chart of the main routine of a process carried out by a CPU 901 of computer 91 at the service center side.

FIG. 6 is a flow chart of the main routine of the process carried out by CPU 901 of computer 91 at the service center. CPU 901 commences the process in response to the power being turned on. First, an initialization process generally carried out by a computer is executed such as initialization of the memory and parameters (step S601). Then, in response to an input operation of various function keys (F1 to F3) on keyboard 93, a communication set process (step S605), an image formation apparatus registration process (step S609), or a firmware transmission process (step 613) is carried out.

When key F1 is input (YES at step S603), a communication set process is carried out at step S605. Specifically, the parameters required for electronic mail transmission by computer 91 are set. For example, the IP address of mail server 83 connected to the LAN at the service center side, the electronic mail address of computer 91 and the like are input and stored in fixed storage device 904. The electronic mail address of computer 91 is set in the From field when computer 91 transmits electronic mail with firmware attached to monitor device 41.

When key F2 is input (YES at step S607), a registration process of an image formation apparatus is carried out at step S609. Specifically, the machine type of each image formation apparatus, the electronic mail address of monitor device 41 monitoring the operation of the image formation apparatus, information of the name, address, telephone number and the like of the user of each image formation apparatus are stored in fixed storage device 904.

When key F3 is input (YES at step S611), a firmware transmission process is carried out at step S613. Specifically, firmware of the machine type that is the target of rewriting is attached to electronic mail and transmitted to monitor device 41.

FIG. 7 shows an example of data registered in fixed storage device 904 at the image formation apparatus registration process (step S609) of FIG. 6. The operator of the service center inputs information associated with the relevant image formation apparatus using keyboard 93, mouse 94 and the like to computer 91, prior to rewriting the firmware of the image formation apparatus.

As shown in FIG. 7, the information associated with the image formation apparatus includes the machine type of the image formation apparatus, and the electronic mail address of monitor 41 that monitors the operation status of the corresponding image formation apparatus. Additionally, user information such as the name, address, telephone number and the like of the user of the image formation apparatus can be included to facilitate identification of the image formation apparatus.

The information associated with the image formation apparatus is input to computer 91 and stored in fixed storage device 904 in a table format as shown in FIG. 7. For the sake of simplification, this information in a table format is referred to as "registration information table" hereinafter.

Figure 8:
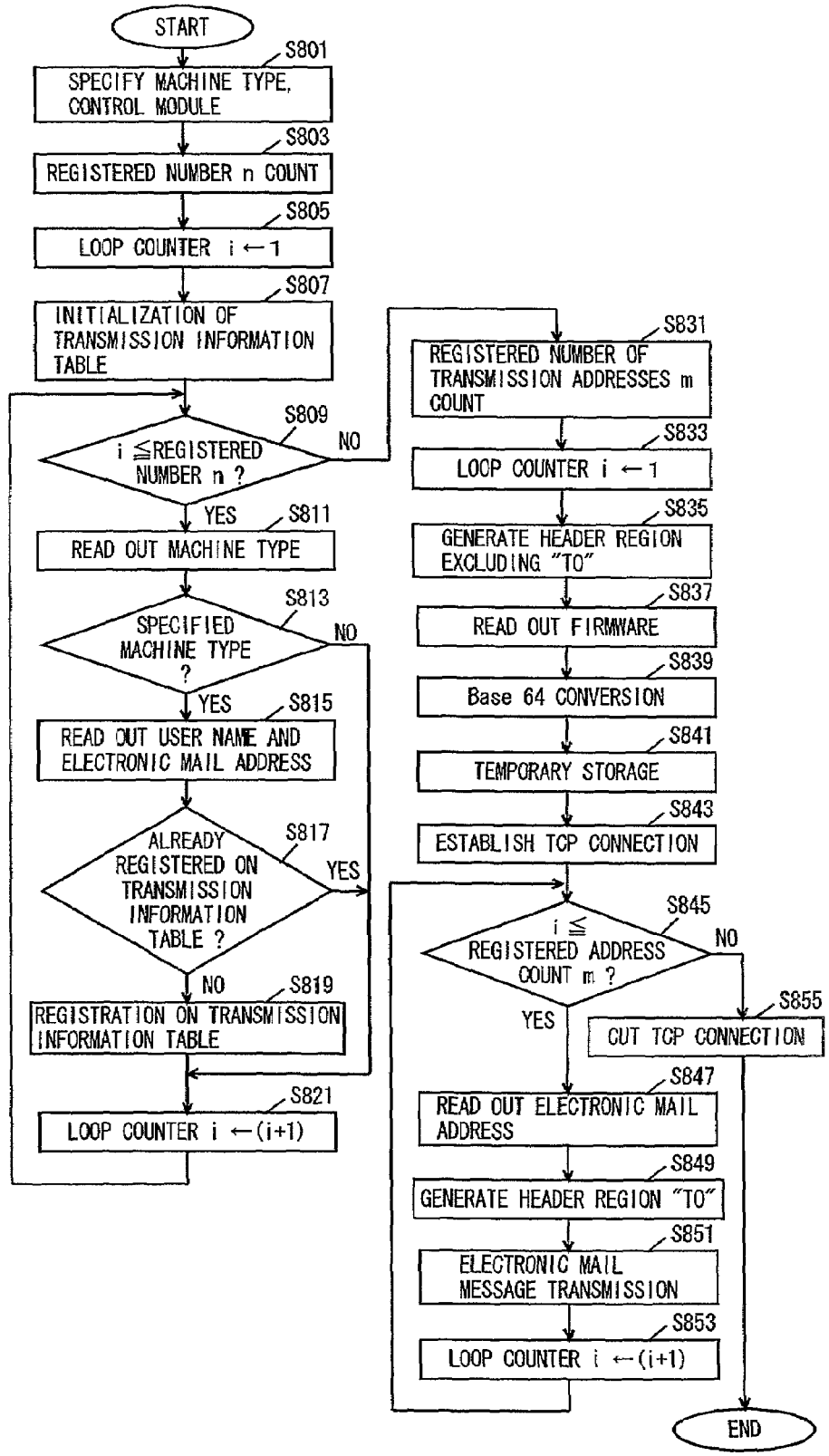
FIG. 8 is a flow chart of the details of a firmware transmission process (step S613) of FIG. 6.

The process flow will be described hereinafter of an electronic mail message with firmware attached being generated by computer 91 and transmitted to monitor device 41 when the firmware of the image formation apparatus has to be rewritten. FIG. 8 is a flow chart of the details of the firmware transmission process (step S613) of FIG. 6.

Referring to FIG. 8, the operator of the service center uses keyboard 93, mouse 94 and the like to specify the machine type of the image formation apparatus that is the target of firmware rewriting as well as the control module thereof at computer 91. The machine type and control module are specified since the firmware of an image formation apparatus generally differs depending upon the machine type and the control module.

At step S803, the total number n of the image formation apparatuses currently registered is counted from the registration information table (FIG. 7) stored in fixed storage device 904. At step S805, loop counter i is set to 1. At step S807, the transmission information table is initialized. The transmission information table stores the list of mail addresses of destinations to which an electronic mail message is to be transmitted.

From step S809 to step S821, a registration process onto the transmission information table is carried out for the machine type specified at step S801 (for example, model 1) from all the image formation apparatuses registered in the registration information table of FIG. 27.

When the value of loop counter i is equal to or lower than the number of registrations n in the registration information table at step S809 (YES at step S809), control proceeds to step S811 where the machine type of the image formation apparatus is read out from the i-th record from the top in the registration information table. At step S813, determination is made whether the read out machine type is the machine type specified at step S801.

When it is the specified machine type (YES at step S813), control proceeds to step S815 to read out the electronic mail address of the monitor device that monitors the operational status of the image formation apparatus from the i-th record from the top in the registration information table. Specifically, the electronic mail address in the column of "Electronic Mail Address" of No. i in FIG. 7 is read out. For example, in the case of model 1, the electronic mail address of Nos. 1, 2 and 4 is read out.

At step S817, determination is made whether the read out electronic mail address is already registered in the transmission information table. When the electronic mail address is not yet registered in the transmission information table (NO at step S817), control proceeds to step S819 to register the read electronic mail address on the transmission information table.

When the electronic mail address is already registered in the transmission information table (YES at step S817), control skips step S819 to proceed to step S821. At step S821, the count of loop counter i is incremented by 1. Then, control returns to step S809.

Thus, the process from step S809 to step S821 is carried out for all the image formation apparatuses registered in the registration information table. Specifically, the electronic mail address corresponding to the specified machine type is read out from the registration information table and then registered on the transmission information table without any duplication. Thus, when the same one user possesses a plurality of apparatuses of the same machine type, the firmware of only one apparatus for one machine type is required to be transmitted through electronic mail instead of transmitting a plurality of firmware corresponding to the plurality of apparatuses through electronic mail.

When the process for all the apparatuses is completed (NO at step S809), control proceeds to step S831. Subsequently, the process of transmitting electronic mail with firmware attached is actually carried out.

At step S831, the total number of electronic mail addresses m registered on the transmission information table is counted. At step S833, 1 is set as loop counter i.

At step S835, the header region excluding "To" of the electronic mail message is generated. At step S837, the target firmware is read out from fixed storage device 904. At step S839, a Base 64 conversion that will be described afterwards is carried out to attach that firmware to electronic mail. The generated electronic mail header region and Base 64-converted firmware are temporarily stored in RAM 903.

At step S843, TCP connection with the mail server is established to commence communication. At step S845, determination is made whether the value of loop counter i is equal to or smaller than the registered number m of transmission addresses in the transmission information table.

When the value is equal to or smaller than the registered transmission address number m (YES at step S845), control proceeds to step S847 to read out the electronic mail address from the i-th record from the top in the transmission information table. At step S849, the temporarily-stored electronic mail message is derived, and the "To" portion of the header region is generated. Specifically, the read out electronic mail address is written into the region of To.

At step S851, the generated electronic mail is transmitted to the read out electronic mail address. Specifically, the electronic mail is transmitted to the IP address of mail server 83 set at step S605 of FIG. 6. Here, the protocol employed is the SMTP protocol (RFC 821) that is the Internet standard of electronic mail transmission. Then, at step S853, loop counter i is incremented by 1, and control returns to step S845.

Thus, the process from step S845 to step S853 is repeated until the firmware is transmitted to all monitor devices that monitor the operational status of the image formation apparatus of the machine type specified by the operator at step S801.

When the value of loop counter i becomes larger than the transmission address registered number m (NO at step S845), control proceeds to S855 to cut the TCP connection with mail server 83. The firmware transmission process ends here.

Figure 9:
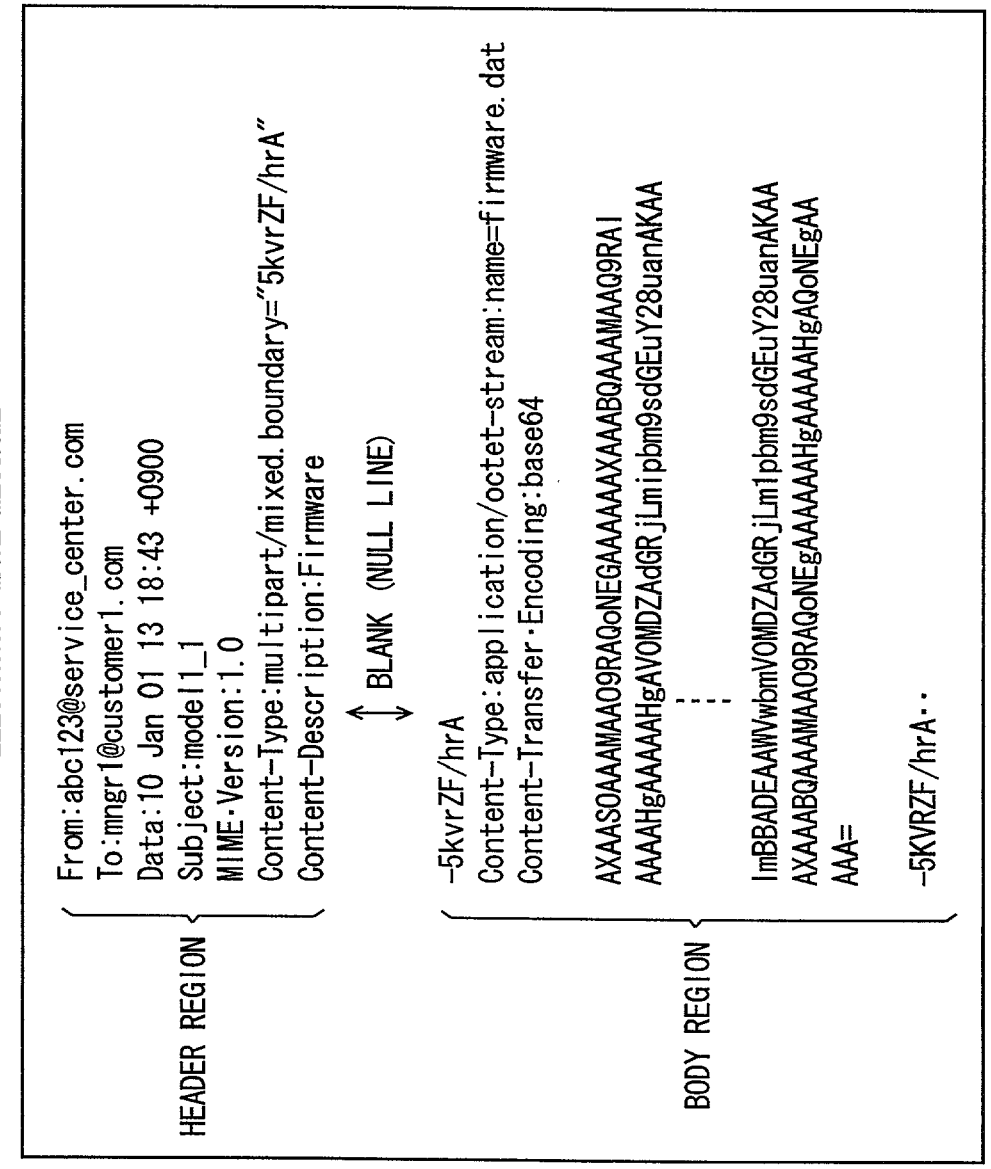
FIG. 9 shows an example of a message of electronic mail with firmware attached of an image formation apparatus.

Electronic mail with firmware attached will be described in detail with reference to FIG. 9. FIG. 9 shows an example of a message of electronic mail with firmware attached for an image formation apparatus. According to the Internet standard (RFC 822) relating to electronic mail messages, the message field of the electronic mail is mainly divided into a header region and a body region, delimited by a NULL line therebetween.

The header region is formed of a plurality of header fields defined by the Internet standard (RFC 822). Each header field is constituted by a field name from the beginning to ":", and a subsequent field body.

It is to be noted that the firmware of an image formation apparatus is binary data. It is inhibited by RFC 822 to directly write binary data into the message of electronic mail. Therefore, the MIME (Multipurpose Internet Mail Extensions) defined by RFC 2045, 2046, 2047 is utilized to attach the firmware of an image formation apparatus as a file in the body region of the message.

In addition to the fields of "From", "To", "Date", "Subject" and the like defined by RFC 822, the fields of "MIME-Version", "Content-Type" and "Content-Description" corresponding to the MIME extension definitions are provided at the header region of the message.

In the field body of the Subject field, a character string of the name of the machine type specified by the operator and the number of the target control module of the firmware to be attached, connected by an under bar, are written. For example, when the machine type is "model1" and the number of the target control module is "1", a character string of "model_1" is provided.

In the field body of the Content-Type field, "Multipart/mixed" is specified so as to set the message body region dividable into a plurality of parts, and an appropriate US-ASCII character string ("5kvrZF/hrA" after the character string here) is specified for the "Boundary" parameter indicating the boundary of respective parts.

According to the MIME extension definition, arbitrary US-ASCII characters may be written in the field body of the Content-Description field. In this electronic mail message, "Firmware" is written to indicate that firmware is attached to the message.

In the body region of the message, a character string with "-" added to the beginning of the value of the boundary parameter ("5kvrZF/hrA" in FIG. 9) in the Content-Type field of the header region is written to specify the beginning of one part. The Content-Type field is written below to specify "application/octet-stream" indicating that the file attached to the field body is binary data.

Therebelow, the "Content-Transfer-Encoding" field is written to specify "base 64" in the field body. Since direct description of binary data into the message of the electronic mail is inhibited by RFC 822, binary data must be converted into US-ASCII text. According to the MIME extension definition, a plurality of schemes for the conversion are defined. The Base 64 scheme is one thereof.

The binary data of firmware is converted into US-ASCII character by the Base 64 scheme and added below the above-described two fields. Lastly, a character string with "__" added before and after the value of the boundary parameter ("5kvrZF/hrA" in FIG. 9) of the Content-Type field of the header region is written.

Figure 10:
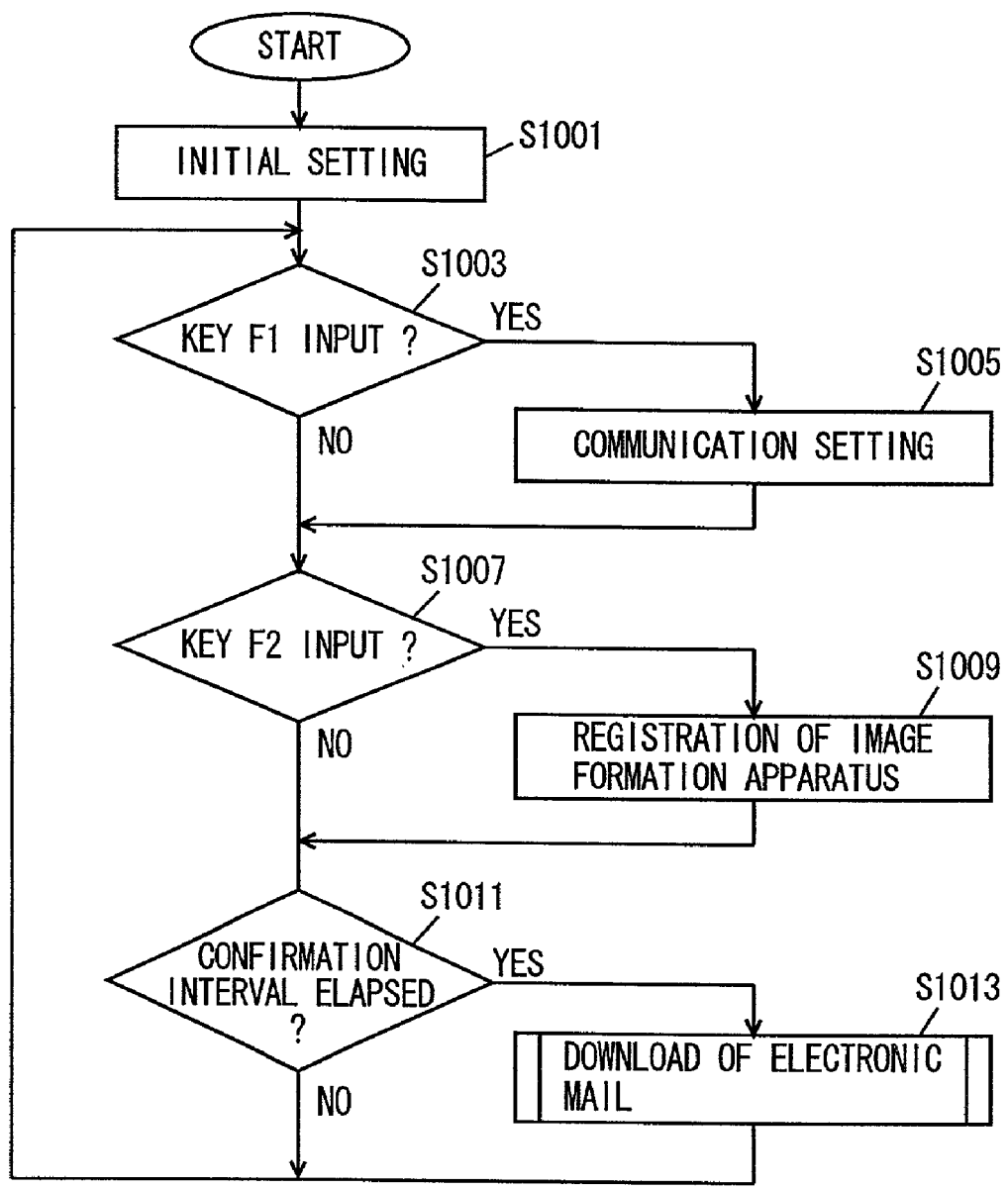
FIG. 10 is a flow chart of the main routine of a process carried out by a CPU 401 of monitor device 41.

The process at the user side will be described hereinafter. FIG. 10 is a flow chart of the main routine of the process carried out by CPU 401 of monitor device 41. Referring to FIG. 10, CPU 401 commences the process by having power turned on. First, the initialization process that is generally carried out by the computer such as the initialization of the memory and parameters is carried out (step S1001). Then, a communication set process (step S1005), an image formation apparatus registration process (step S1009) or an electronic mail download process (step S1013) are carried out, as necessary.

For example, when key F1 on keyboard 43 is input by the user (YES at step S1003), control proceeds to step S1005 to set the parameter required to transmit/receive electronic mail. Specifically, the IP address of mail server 33 connected to the LAN of the user side, the name and password of the electronic mail account of monitor device 41 on mail server 33, the electronic mail address of monitor device 41, and a time interval to periodically check whether new electronic mail addressed to monitor device 41 has been delivered or not are input and stored in fixed storage device 404.

When key F2 is input by the user (YES at step S1007), control proceeds to step S1009 to carry out the registration process of the image formation apparatus monitored by monitor device 41. Specifically, the machine type of each image formation apparatus, the IP address, and other information related to the image formation apparatus are input and stored in fixed storage device 404.

FIG. 11 shows an example of a registration table of an image formation apparatus stored in fixed storage device 404 of monitor device 41. Referring to FIG. 11, the machine type of each image formation apparatus connected to the LAN and under control of monitor device 41, the IP address, and other information are stored in a predetermined region of fixed storage device 404 in a table format. This table is referred to as "registration address table" hereinafter.

Returning to FIG. 10, determination is made whether the time interval for checking delivery has elapsed or not at step S1011. Specifically, determination is made whether the time period set at step S1005 (the time interval to confirm whether a new electronic mail message addressed to monitor device 41 has arrived or not) has elapsed.

When the time interval has elapsed (YES at step S1011), control proceeds to step S1013 where CPU 401 confirms whether a new electronic mail message has been delivered with respect to mail server 33, and downloads the required electronic mail. When the time interval for confirmation has not yet elapsed (NO at step S1011), control returns, for example, to step S1003, to repeat the above process until the confirmation interval has elapsed.

FIG. 10 corresponds to the case where an image formation apparatus that is monitored by monitor device 41 is to be registered by a user (step S1009). It will be understood that such description is merely exemplary. For example, an SNMP (Simple Network Management Protocol) which is the management communication protocol of a network device can be used. A resident SNMP agent can be provided at each image formation apparatus with monitor device 41 functioning as the SNMP manager. Accordingly, monitor device 41 can search for an image formation apparatus connected to the LAN, even if the user has not registered the image formation apparatus that is the subject of monitoring, and register the relevant image formation apparatus on the registration address table.

The process of monitor device 41 confirming whether a new message addressed to itself has been delivered to mail server 33, and downloading the new message, when delivered, will be described hereinafter.

Figure 12:
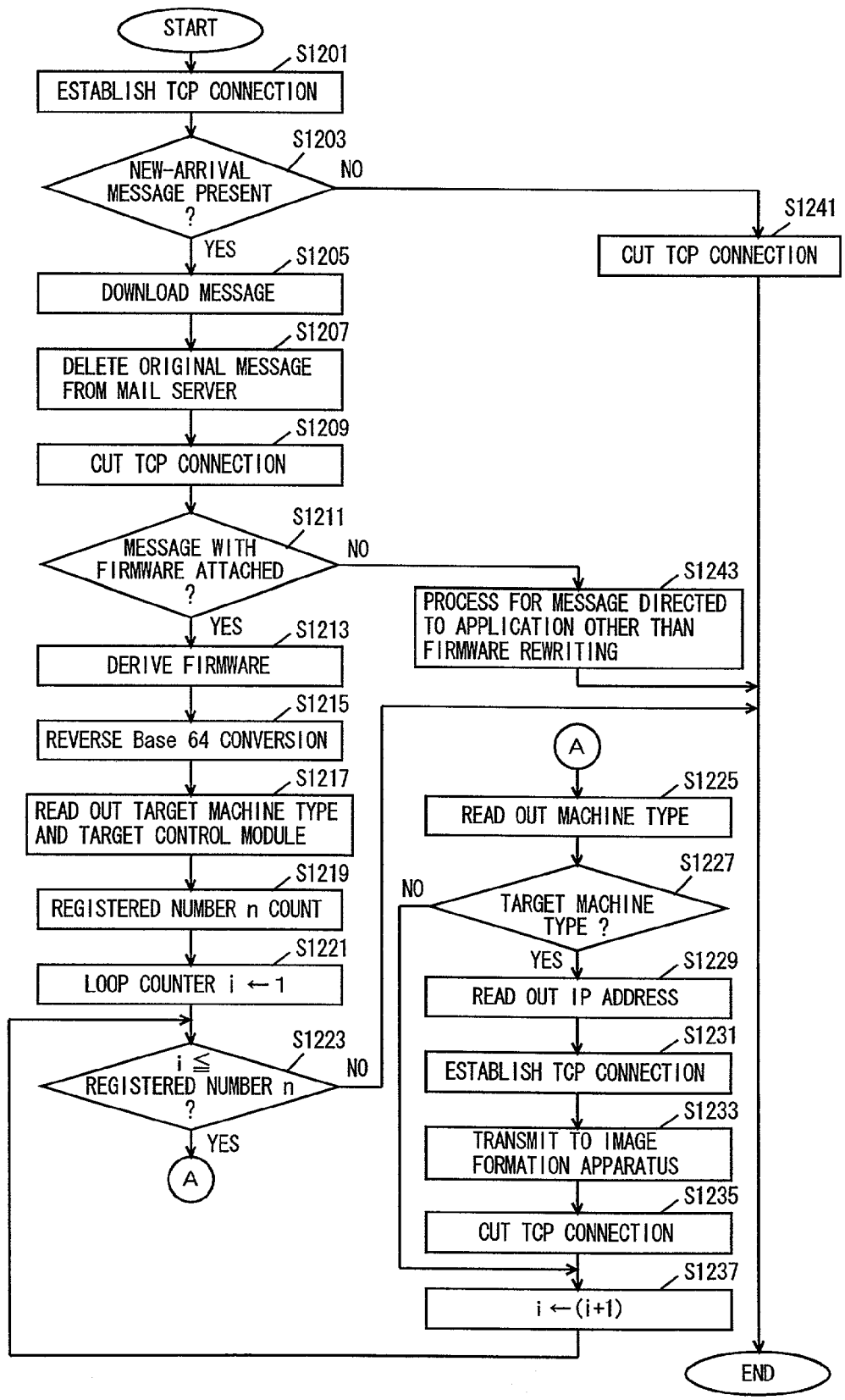
FIG. 12 is a flow chart of the details of an electronic mail download process (step S1013) of FIG. 10.

FIG. 12 is a flow chart of the details of the electronic mail download process (step S1013) of FIG. 10. At step S1201 of FIG. 12, the TCP connection with mail server 33 is established based on the IP address of mail server 33 set at step S1005 of FIG. 10. A check is made whether a new message addressed to itself has been delivered or not (step S1203).

A POP3 (Post Office Protocol Version 3) protocol is used in this confirmation process as well as in the process that will be described afterwards of downloading a new message addressed to monitor device 41, when delivered to mail server 33. Here, it is assumed that only one message is downloaded at one TCP connection even in the case where a plurality of new messages addressed to monitor device 41 are delivered to mail server 33.

In the case where a new message addressed to monitor device 41 is delivered to mail server 33 as a result of checking for a newly-arrived message (YES at step 1203), that message is downloaded from mail server 33 at step S1205. At step S1207, the original of the message downloaded from mail server 33 is deleted. At step S1209, the TCP connection is cut.

When a new message addressed to monitor device 41 has not been delivered (NO at step S1203), control proceeds to step S1241 where the TCP connection is immediately cut. The electronic mail download process ends.

When the TCP connection is cut at step S1209, control proceeds to step S1211 to check whether firmware is attached to the downloaded message. This check is made based on whether the description in the field body of the Content-Description field in the header region of the message is "Firmware" or not.

When firmware is attached (YES at step 1211), control proceeds to step S1213 where the US-ASCII character of the firmware portion is derived from the message. At step S1215, the derived US-ASCII character is restored to binary data by reverse Base 64 conversion.

At step S1217, the machine type corresponding to that firmware and the target control module are read out from the description in the Subject field of the header portion of the message.

At step S1219, the total number of registered image formation apparatuses n is counted from the registration address table stored in fixed storage device 404. At step S1221, 1 is set as loop counter i. At step S1223, comparison between loop counter i and registered number n is carried out.

When the value of loop counter i is equal to or smaller than registration number n, the transmission process of steps S1225 and et seq. is carried out. When the value of loop counter i is larger than registered number n, the electronic mail download process ends.

When the value loop counter is equal to or smaller than registered number n (YES at step S1223), control proceeds to S1225 to read out the machine type of the image formation apparatus from the i-th record from the top in the registration address table. At step S1227, determination is made whether the read out machine type is the target machine type. Specifically, determination is made whether the read out machine type matches the machine type that is the subject of firmware rewriting read out at step S1217.

In the case where that machine type is the target machine type of the received firmware (YES at step S1227), control proceeds to step S1229 to read out the IP address of the image formation apparatus from the i-th record from the top in the registration address table. At step S1231, the TCP connection with the target image formation apparatus is established based on the read out IP address.

At step S1233, the firmware and the number of the target control module are transmitted to the image formation apparatus. When the transmission process ends, control proceeds to step S1235 to cut the TCP connection. At step S1237, the loop counter i is incremented by 1, and control returns to step S1223.

At the completion of the process for all the image formation apparatuses registered in the registration address table (NO at step S1223), the electronic mail download process ends.

When determination is made that firmware is not attached to the downloaded message at step S1211 (NO at step S1211), control proceeds to step S1243 where a general process carried out when a message directed to an application other than the firmware rewrite process of an image formation apparatus is received is executed normally. Thus, the electronic mail download process ends.

The message from the mail server is downloaded at monitor device 41, and the downloaded message is transmitted to an appropriate image formation apparatus among the image formation apparatuses under control.

By carrying out the process from step S1227 to step S1235 for all the image formation apparatuses registered in the registration address table, the firmware transmitted for only one apparatus can be transmitted to image formation apparatuses of the same type.

Thus, in the case where the same user possesses a plurality of apparatuses of the same type, the firmware of only one apparatus is transmitted from the service center to the user side, and the monitor device at the user side receiving the firmware transmits that firmware to all the target apparatuses.

Figure 13:
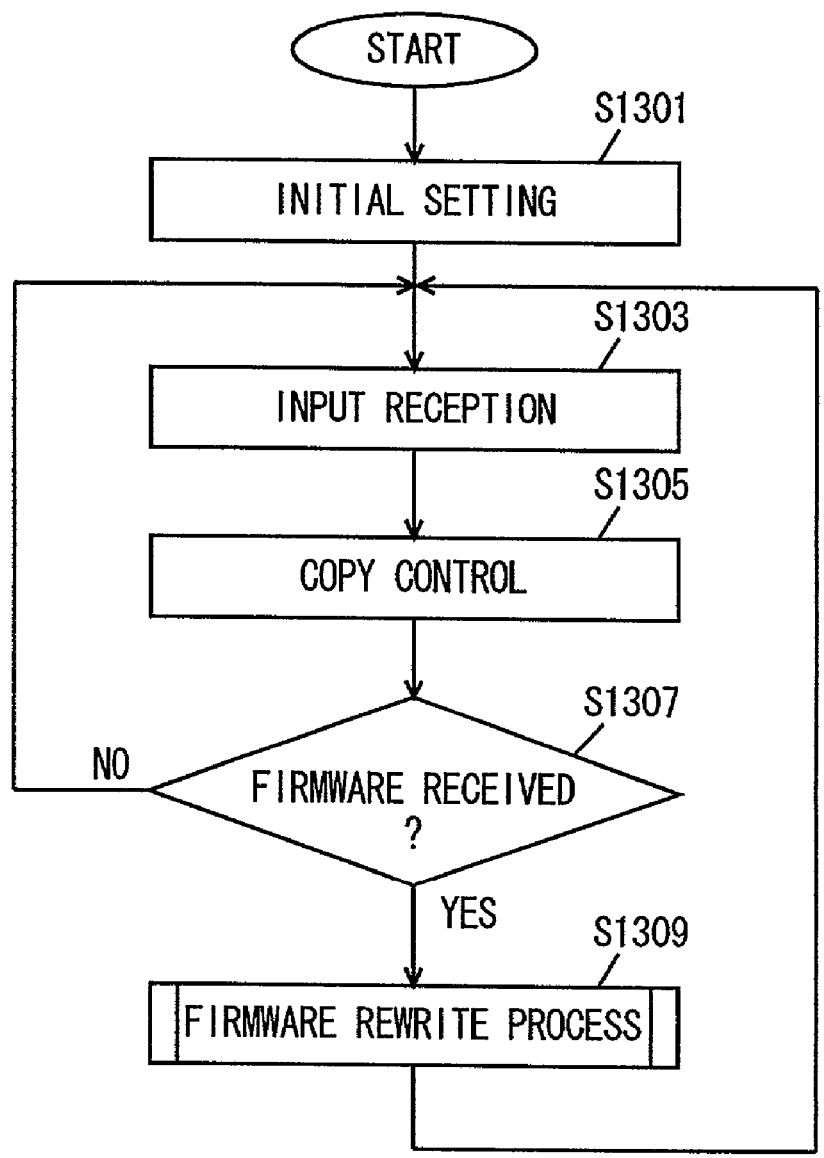
FIG. 13 is a flow chart of the basic process of image formation apparatus 11.

The process carried out by image formation apparatus 11 will be described hereinafter. FIG. 13 is a flow chart of the basic process of image formation apparatus 11. Image formation apparatus 11 commences the process by being turn on. At each control module, initialization such as clearing the memory and setting the standard mode is carried out (step S1301). Then, an input reception process (step S1303) and a copy control process (step S1305) are repeatedly executed until a firmware reception notification is issued from printer controller 21.

At step S1303, reception of various input signals is effected at one time. The input signals include, for example, the input signal from the key switch group on operation panel 118 and from various sensor groups in image formation apparatus 11, or a print job or the like transmitted from printer controller 21.

At step S1305, a copy control process, i.e., the process required for the operation of image formation apparatus 11, is carried out. Specifically, the process includes control of various operation units such as sheet feed control, scanning control, photoreceptor drum control, developer device control, or a process according to a print job or the like from printer controller 21.

When a firmware download notification is issued from printer controller 21 (YES at step S1307), control proceeds to step S1309 to carry out a firmware rewrite process. When the firmware rewrite process ends, control returns to step S1303. The process of step S1303 and step S1305 is repeated until a firmware reception notification is provided again.

The firmware rewrite process of image formation apparatus 11 will be described hereinafter. The firmware and the number of the target control module transmitted by monitor device 41 are received at printer controller 21 via the Internet and the LAN. The received data is sent through serial I/F 205 of printer controller 21 and serial I/F 117 of the image formation apparatus to be received at CPU 111 of the image formation apparatus. When CPU 111 receives the firmware, the flash ROM in the target control module of the received firmware is rewritten as set forth below.

Figure 14:
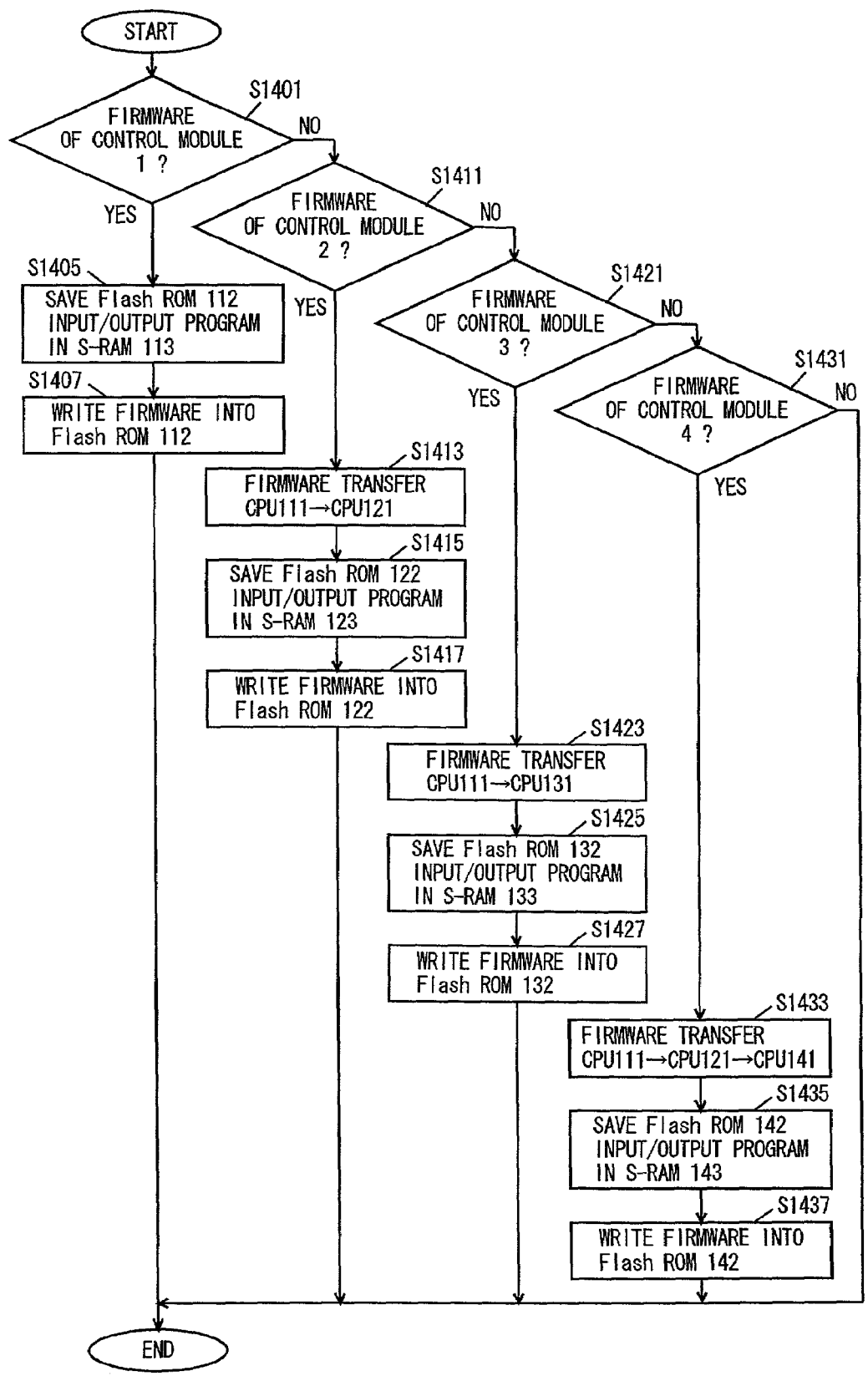
FIG. 14 is a flow chart of the details of a firmware rewrite process (step S1309) of FIG. 13.

FIG. 14 is a flow chart of the details of the firmware rewrite process (step S1309) of FIG. 13. Referring to FIG. 14, determination is made of which of control modules 1–4 the received firmware corresponds to through steps S1401, S1411, S1412 and S1431.

When determination is made that the firmware corresponds to control module 1 (YES at step S1401), control proceeds to step S1405 where the input/output program with respect to flash ROM 112 is saved in S-RAM 113. At step S1407, the firmware is written into flash ROM 112 using the saved input/output program.

When determination is made that the received firmware corresponds to control module 2 (YES at step S1411), control proceeds to step S1413 where the firmware is transferred from CPU 111 to CPU 121 of control module 2. At step S1415, the input/output program for flash ROM 122 is saved in S-RAM 123. Then, the firmware is written into flash ROM 122 using the saves input/output program (step S1417). Thus, the firmware rewrite process ends.

When determination is made that the received firmware corresponds to control module 3 (YES at step S1421), control proceeds to step S1423 where the firmware is transferred from CPU 111 to CPU 131 of control module 3. At step S1425, the input/output program for flash ROM 132 is saved in S-RAM 133. Then, the firmware is written into flash ROM 132 using the saved input/output program (step S1427). Thus, the firmware rewrite process ends.

When determination is made that the received firmware corresponds to control module 4 (YES at step S1431), control proceeds to step S1433 where the firmware is transferred from CPU 111 to CPU 141 of control module 4. At step S1435, the input/output program for flash ROM 142 is saved in S-RAM 143. Then, the firmware is written into flash ROM 142 using the saved input/output program (step S1427). Thus, the firmware rewrite process ends.

According to the system of the present embodiment, individual transmission to all the target image formation apparatuses is not effected even in the case where the same user possessing a plurality of image formation apparatuses of the same type is to rewrite the firmware thereof simultaneously. Therefore, the traffic of the Internet and the LAN at both the service center side and user side will not be increased more than needed. Also, the load on the mail server at the service center side and user side can be alleviated.

Through the Internet, the electronic mail attached with firmware is transmitted only once. The firmware is then derived and transmitted to the destination of an identified device. Therefore, when there are many devices that are the subject of transmission, increase of the communication traffic due to the transmission of electronic mail for a plurality of times corresponding to the many numbers of devices can be avoided. Also, the load on the mail server can be alleviated.

Thus a data communication program product is provided that can prevent increase of the communication traffic and that can reduce the load on the mail server even in the case where the same firmware of a plurality of devices connected to the network are all to be altered using an electronic mail system.

According to the present embodiment, the machine type information of the device is registered on the memory, and the machine type information of the device is derived from electronic mail. The machine type information of the device matching the machine type information of the device derived from the electronic mail is retrieved from the memory, and the device that is the subject of firmware transmission is identified. Thus, the device that is the subject of transmission can be identified easily and appropriately.

FIG. 12 corresponds to the case where, when the IP address of a target image formation apparatus that is the subject of transmission is read out at step S1229, firmware is transmitted immediately to that image formation apparatus at step S1233. It is to be understood that such description is merely exemplary. The operating status of the image formation apparatus that is the subject of transmission can be checked so as to commence transmission at an appropriate timing thereof. Accordingly, firmware can be transmitted at a more appropriate status.

The present embodiment corresponds to the case where firmware is sequentially transferred to a plurality of image formation apparatuses of the same type by monitor device 41. Alternatively, a structure can be implemented in which, only when firmware writing into the image formation apparatus to which the firmware has been first transferred by monitor device 41 succeeds, firmware is transferred to the second image formation apparatus.

Specifically, a check sum 1 of the received firmware is calculated and stored in S-RAMs 113, 123, 133 and 143 during step S1401 to step S1405, during step S1411 to step S1413, during step S1421 and step S1423, and during step S1431 and step S1433. Then, following steps S1407, S1417, S1427 and S1437, the contents of rewritten flash ROMs 112, 122, 132 and 142 are read out and a check sum 2 is calculated.

Check sum 2 is compared to check sum 1 stored in S-RAMs 113, 123, 133 and 143 to determine that rewriting has succeeded when the values match each other. Determination is made that rewriting has failed when the values do not matched.

When the firmware rewrite result of any control module is transmitted to monitor device 41, monitor device 41 conducts waiting until a rewrite result is received during step S1233 to step S1235. When rewriting has succeeded, control proceeds to step S1235 to transfer the firmware to the next image formation apparatus. In the case where rewriting has failed, the process ends, and firmware is not transferred to the next image formation apparatus.

Thus, firmware is transferred to another image formation apparatus only when the rewriting of the firmware of all control modules has succeeded. Therefore, any useless firmware transfer process in the case of rewrite failure is eliminated. This is particularly advantageous in the case where the firmware size as in an image formation apparatus is great and firmware has to be written to a plurality of control modules many times. Also, the erroneous rewriting of firmware to other plurality of image formation apparatuses is avoided. The failure is limited to only the first transferred apparatus, and the damage can be minimized.

Alternatively, a plurality of firmware can be derived from one or more electronic mails to be transmitted to one device. Then, the firmware is transmitted to the next second device only when the rewriting of all the firmware has succeeded as determined from the received write result. With regards to a divisional firmware in which the firmware for one module is divided into a plurality of firmware, the rewrite process is often carried out after the divided firmware are collected and available to one module. In this case, the next transmission is carried out only when the rewriting for all the firmware has succeeded. If any one rewriting has failed, transmission of the same firmware to another device will be a useless transmission process since a proper operation of the device cannot be expected. Thus, an efficient firmware transfer process can be carried out.

The firmware communication method (data communication method) carried out by monitor device 41, image formation apparatus 11 and printer controller 21 can be realized by a program to carry out the above-described series of processing. This data communication program can be installed in advance in respective hard disks of monitor device 41, image formation apparatus 11 and printer controller 21. Alternatively, it may be recorded in a detachable recording medium such as a CD-ROM or a magnetic tape. In any case, the data communication program is recorded in a computer-readable recording medium.

Second Embodiment

A second embodiment of the present invention will be described in detail hereinafter with reference to the drawings.

Figure 15:
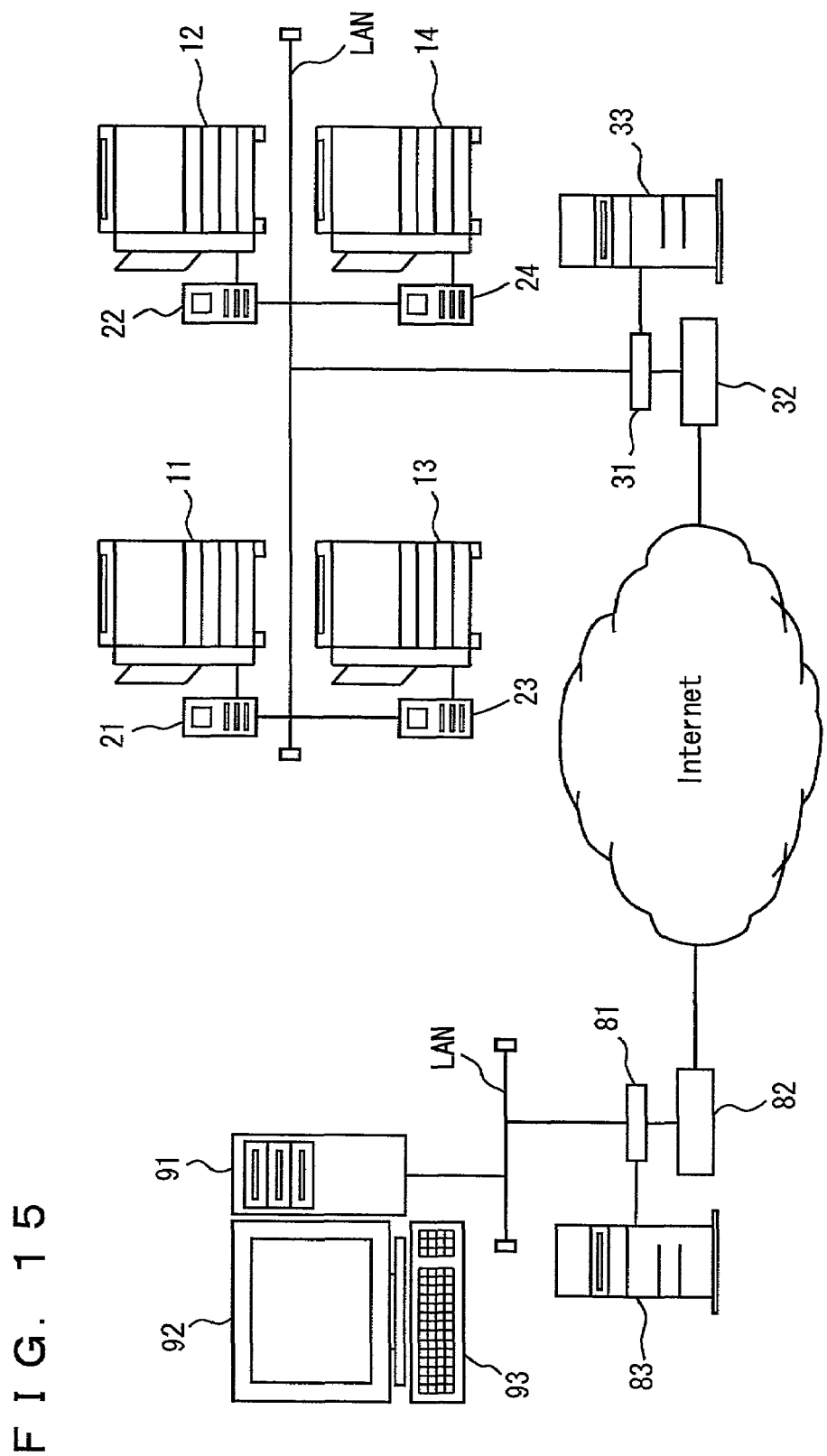
FIG. 15 shows a system structure to implement a firmware rewrite method according to a second embodiment of the present invention.

FIG. 15 shows a system structure to realize the firmware rewrite method of the second embodiment. Referring to FIG. 15, the present system is constituted by the apparatus of the user side including a plurality of image formation apparatuses, the apparatus of the service center side to transmit firmware to an image formation apparatus, and the Internet providing connection therebetween.

In the present system, the apparatus of a plurality of users (sets) can be connected to the apparatus of one service center side. However, for the sake of simplification, description is provided based on the case where the apparatus of one user (set) is provided.

The apparatus of the user side includes a plurality of image formation apparatuses 11, 12, 13, and 14, and printer controllers 21, 22, 23 and 24 connected to respective image formation apparatuses.

Printer controllers 21, 22, 23 and 24 are connected to firewall 31 via the LAN, and then to the Internet via router 32. Also, mail server 33 that compiles electronic mail and provides distribution service is connected to the LAN.

In the drawing, the printer controller and image formation apparatus are indicated as separate apparatuses. Alternatively, an integral structure with the function of a printer controller incorporated in an image formation apparatus can be employed. In this case, the printer controller and control module 1 (described afterwards) execute the process while establishing liaison with each other.

At the service center side, computer 91 to transmit firmware is installed. Computer 91 is connected to firewall 81 via the LAN, and then to the Internet via router 82 to communicate with printer controller 21 at the user side. Mail server 83 that complies electronic mail and provides distribution service is connected to the LAN.

The firmware rewriting operation will be described briefly here. New firmware from computer 91 of the service center side is attached to electronic mail, and transmitted to one image formation apparatus of the user side, for example transmitted towards image formation apparatus 11. The electronic mail with firmware attached passes through the LAN of the service center side, mail server 83, the Internet, the LAN of the user side to be stored in the mail box of mail server 33.

Printer controller 21 of image formation apparatus 11 at the user side downloads the electronic mail from mail server 33. The firmware is derived from the electronic mail to be written into the flash ROM that is the subject of rewriting of image formation apparatus 11. When rewriting of this new firmware succeeds, the derived firmware is transmitted via the LAN to another image formation apparatus that is the subject of transmission. The image formation apparatus receiving the firmware carries out rewriting of the new firmware into the flash ROM that is the subject of rewriting.

The hardware structure of the apparatuses shown in FIG. 15 is similar to that of the first embodiment (FIGS. 2, 3 and 5).

In fixed storage device 904 of computer 91, image formation apparatus registration information including the machine type of image formation apparatuses 11, 12, 13, 14 and the electronic mail address of the apparatus that becomes the parent (representative) of a plurality of image formation apparatuses of the same type are stored. Also, the firmware corresponding to the machine type of the image formation apparatus is stored.

The operator of the service center stores the firmware in different predetermined folders/directories in fixed storage device 904 according to the machine type and the control module.

In the system shown in FIG. 15, the operation of the firmware of an image formation apparatus being transmitted through mail from a remote station is similar to that of the previous first embodiment (FIGS. 6–9).

It is to be noted in FIG. 6 that, when key F2 is input (YES at step S607), control proceeds to step S609 where the machine type of each image formation apparatus, the electronic mail address of the parent apparatus among the image formation apparatuses, and the information of the name, address, telephone number and the like of the user of each image formation apparatus are input and stored in fixed storage device 904. Here, the parent device implies an apparatus that is the parent (representative) of a plurality of image formation apparatuses of the same type possessed by the same one user.

For the sake of simplification, image formation apparatuses 11, 12, 13 and 14 shown in FIG. 15 are all of the same machine type. It is assumed that the parent apparatus thereof is image formation apparatus 11. As to the registration of each image formation apparatus, the machine type of respective image formation apparatuses and the address of the image formation apparatus 11 as the electronic mail address of the parent apparatus are registered.

When key F3 is input according to the process of FIG. 6 (YES at step S611), the firmware transmission process is carried out at step S613. It is to be noted that the firmware of the machine type that is the subject of rewriting is attached to electronic mail and then transmitted to the parent apparatus (image formation apparatus 11).

The information associated with an image formation apparatus shown in FIG. 7 includes the machine type of the image formation apparatus and the electronic mail address of the parent image formation apparatus. Additionally, user information such as the name, address, telephone number and the like of the user of the image formation apparatus can be included to facilitate identification of the image formation apparatus.

In the case where the firmware of an image formation apparatus must be rewritten according to the process of the flow chart shown in FIG. 8, it is assumed that computer 91 generates an electronic mail message with firmware attached and transmits the generated electronic mail to parent image formation apparatus 11.

When the machine type matches the specified machine type at step S813 of FIG. 8 (YES at step S813), control proceeds to step S815 where the electronic mail address of the parent image formation apparatus is read out from the i-th record from the top in the registration information table. Specifically, the electronic mail address indicated in the column of "Electronic Mail Address" of No. i in FIG. 7 is read out.

According to the process of FIG. 8, the process of step S845 to step S853 is repeated until the firmware is transmitted to all parent image formation apparatuses of the machine type specified by the operator at step S801.

The process at the user side will be described hereinafter. FIG. 16 is a flow chart of the main routine of the process carried out by CPU 201 of printer controller 21 of parent image formation apparatus 11. Referring to FIG. 16, CPU 201 commences the process by having power turned on. The initialization process generally carried out by a computer such as initialization of the memory and parameters is carried out (step S901). Then, the communication set process (step S905), the image formation apparatus registration process (step S909) or the electronic mail download process (step S913) is carried out, as necessary.

For example, when key F1 on operation panel 207 is input by the user (YES at step S903), control proceeds to step S905 where the parameter required to transmit/receive electronic mail is set. Specifically, the IP address of mail server 33 connected to the user's LAN, the name and password of the electronic mail account of image formation apparatus 11 on mail server 33, the electronic mail address of image formation apparatus 11, and a time interval to periodically check whether new electronic mail addressed to image formation apparatus 11 has been delivered or not are input and stored in fixed storage device 204.

When the user inputs key F2 (YES at step S907), control proceeds to step S909 where the registration process of another image formation apparatus that is connected to the LAN and that is of a machine type identical to that of image formation apparatus 11 is carried out. Specifically, the machine type of each image formation apparatus, the IP address and other information associated with the image formation apparatus are input and stored in fixed storage device 204.

FIG. 17 shows an example of an image formation apparatus registration table stored in fixed storage device 204 of printer controller 21 of image formation apparatus 11. Referring to FIG. 17, the machine type name of the image formation apparatus of a machine type identical to that of image formation apparatus 11 connected to the LAN, the IP address, and other information are stored in a predetermined region of fixed storage device 204 in a table format. This table is referred to as "transfer destination information table" hereinafter.

Returning to FIG. 16, determination is made whether the time interval for confirmation has elapsed or not at step S911. Specifically, determination is made whether the time interval set at step S905 (the time interval to confirm whether a new electronic message addressed to image formation apparatus 11 has arrived or not) has elapsed or not.

When the time interval has elapsed (YES at step S911), control proceeds to step S913 where CPU 201 confirms whether a new electronic mail message has been delivered or not to mail server 31, and then carries out the required electronic mail download process. When the time interval has not yet elapsed (NO at step S911), control returns to, for example step S903, to repeat the above-described process until the time interval has elapsed.

The process of printer controller 21 confirming mail server 31 whether a new message address to image formation apparatus 11 has arrived or not, and downloading the new message, if arrived, will be described hereinafter.

Figure 18:
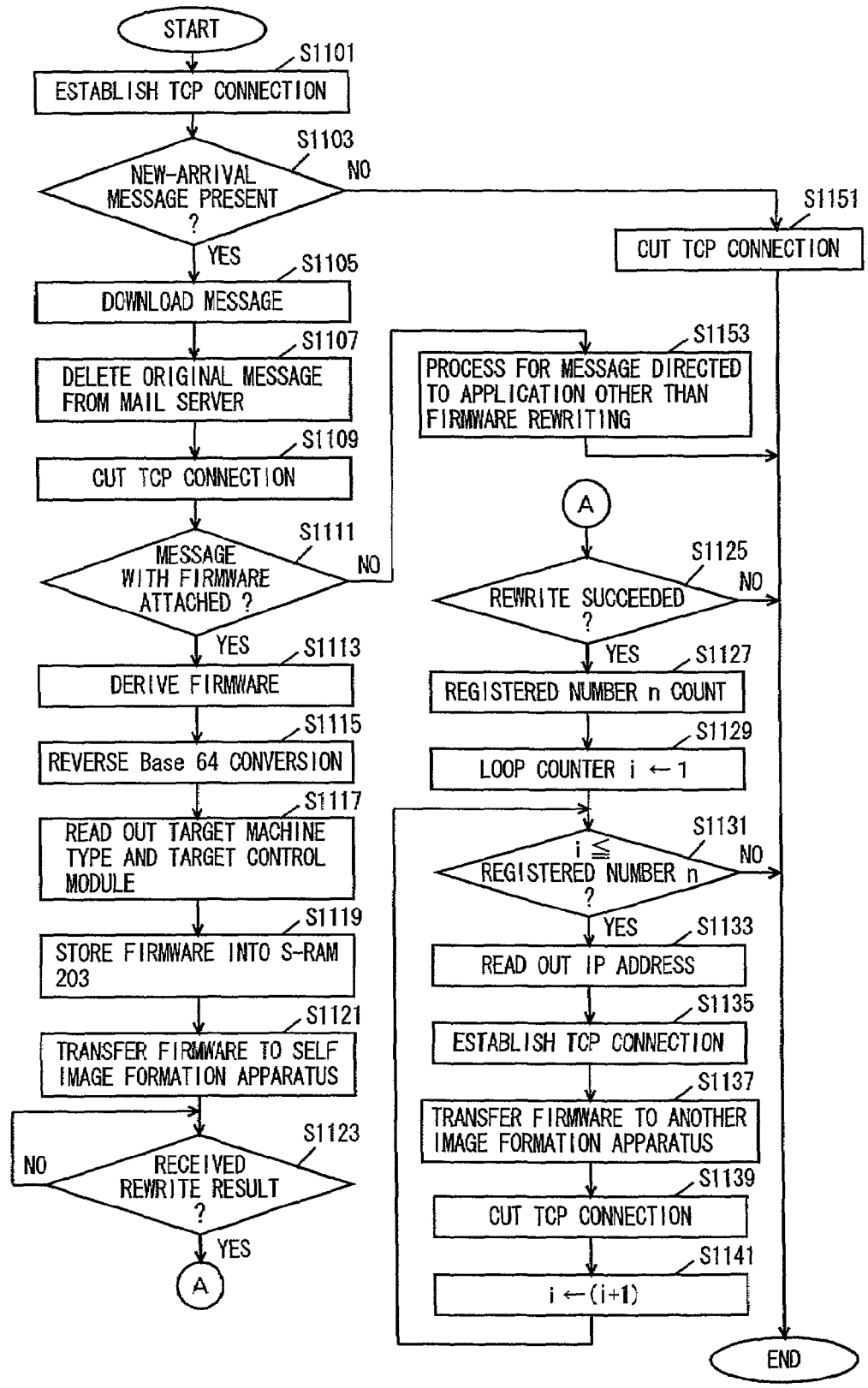
FIG. 18 is a flow chart of the details of an electronic mail download process (step S913) of FIG. 16.

FIG. 18 is a flow chart of the details of the electronic mail download process (step S913) of FIG. 16. At step S1101, the TCP connection with mail server 33 is established based on the IP address of mail server 33 set at step S905 of FIG. 16, and determination is made whether a new message addressed to image formation apparatus 11 has arrived or not (step S1103).

In this confirmation process and the download process of the new message addressed to image formation apparatus 11 that will be described afterwards, the POP3 (Post Office Protocol Version 3) protocol is employed. Here, it is assumed that only one message is downloaded at one TCP connection even in the case where there are a plurality of new messages delivered at mail server 33 addressed to image formation apparatus 11.

When a new message addressed to image formation apparatus 11 has arrived at mail server 33 as a result of confirming any new-arrival messages (YES at step S1103), control proceeds to step S1105 to download the message from mail server 33. At step S1107, the original message downloadedfrom mail server 33 is deleted. At step S1109, the TCP connection is cut.

When there is no new message addressed to image formation apparatus 11 (NO at step S1103), control proceeds to step S1151 where the TCP connection is immediately cut. The electronic mail download process ends.

Upon cutting the TCP connection at step S1109, control proceeds to step S1111 to check whether firmware is attached to the downloaded message. Attachment of firmware can be identified depending upon whether the description in the field body of the Content-Description field in the header region of the message is "Firmware" or not.

When firmware is attached (YES at step S1111), control proceeds to step S1113 where the US-ASCII character of the firmware is extracted from the message. At step S1115, the extracted US-ASCII character is restored to binary data by reverse Base 64.

At step S1117, the target machine type of the firmware and the number of the target control module are read out from the description in the Subject field of the header region of the message.

At step S1119, the firmware and the number of the target control module are temporarily stored in S-RAM 203. At step S1121, the firmware is transferred to image formation apparatus 11 via serial I/F 205.

At step S1123, waiting is conducted until the firmware rewrite result is transmitted from image formation apparatus 11. When the transmission result is received (YES at step S1123), control proceeds to step S1125 to determine whether firmware rewriting has succeeded or not.

When firmware rewriting has succeeded (YES at step S1125), the firmware and the target control module number stored in S-RAM 203 are transferred to another image formation apparatus registered on the transfer destination information table (FIG. 10) by the process of steps S1127 and et seq. When the firmware rewriting has failed (NO at step S1125), the electronic mail download process ends.

Since the firmware is transferred to another image formation apparatus only when firmware rewriting has succeeded, useless transfer of firmware is eliminated. Also, erroneous rewriting to other plurality of image formation apparatuses can be avoided. The failure is limited only to the parent apparatus, and the damage can be suppressed to the minimum level.

Upon success of rewriting, control proceeds to step S1127 where the total number of registered image formation apparatuses n is counted from the transfer destination information table stored in fixed storage device 204. At step S1129, 1 is set at loop counter i. At step S1131, the value of loop counter i and the number of registered apparatuses n are compared.

When the value of loop counter i is equal to or smaller than the registered number n, the transmission process of steps S1131 and et seq. is carried out. When the value of loop counter i is larger than registered number n, the electronic mail download process ends.

When loop counter i is equal to or smaller than registered number n (YES at step S1131), the control proceeds to step S1133 where the IP address of the image formation apparatus is read out from the i-th record from the top in the transfer destination information table. At step S1335, the TCP connection with the target image formation apparatus is established based on the IP address read out.

At step S1137, the firmware and the number of the target control module are transmitted to the image formation apparatus. When the transmission process ends, the TCP connection is cut at step S1139. At step S1141, the value of loop counter is incremented by 1, and control returns to the process of step S1131.

Thus, when the above process for all the image formation apparatuses registered in the transfer destination information table is completed (NO at step S1131), the electronic mail download process ends.

When determination is made that firmware is not attached to the downloaded message at step S1111 (NO at step S1111), control proceeds to step S1153 where the general process carried out when a message directed to an application other than firmware rewriting is executed. Then, the electronic mail download process ends.

Thus, the message is downloaded from mail server 33 at printer controller 21 of the parent apparatus (image formation apparatus 11), and the firmware of the parent apparatus is rewritten when the message correspond to firmware. Upon success of rewriting the parent apparatus, the downloaded message (firmware) is transmitted to another image formation apparatus connected to the LAN from the parent apparatus.

The process carried out at image formation apparatus 11 will be described hereinafter with reference to the flow chart of the basic process thereof shown in FIG. 19. Image formation apparatus 11 commences the process by having power turned on. At each control module, the initialization process such as clearing the memory and setting the standard mode is carried out (step S1201). Then, the input reception process (step S1203) and the copy control process (step S1205) are repeatedly executed until firmware reception notification is issued from printer controller 21.

At step S1203, reception of various input signals is effected at one time. Here, the input signal includes the input signal from the key switch group on operation panel 118 of image formation apparatus 11 and from various sensor groups in image formation apparatus 11, or a print job or the like transmitted from printer controller 21.

At step S1205, the copy control process, i.e., the process required for operation of image formation apparatus 11, is carried out. For example, the process includes control of various operation unit groups such as sheet feed control, scanning control, photoreceptor drum control, developer device control, or a process according to a print job or the like from printer control 21.

Upon notification of firmware downloading from printer controller 21 (YES at step S1207), control proceeds to step S1209 where the firmware rewrite process is carried out. When the firmware rewrite process ends, control returns to step S1203. The process of step S1203 and the step S1205 is repeated until reception of the firmware is notified again.

The firmware rewrite process of image formation apparatus 11 will be described here. The firmware and the target control module number transmitted from printer controller 21 via serial I/F 205 are received at CPU 11 via serial I/F 117 of image formation apparatus 11. In the case where CPU 111 receives firmware, the flash ROM of the target control module of the received firmware is rewritten as set forth below.

Figure 19:
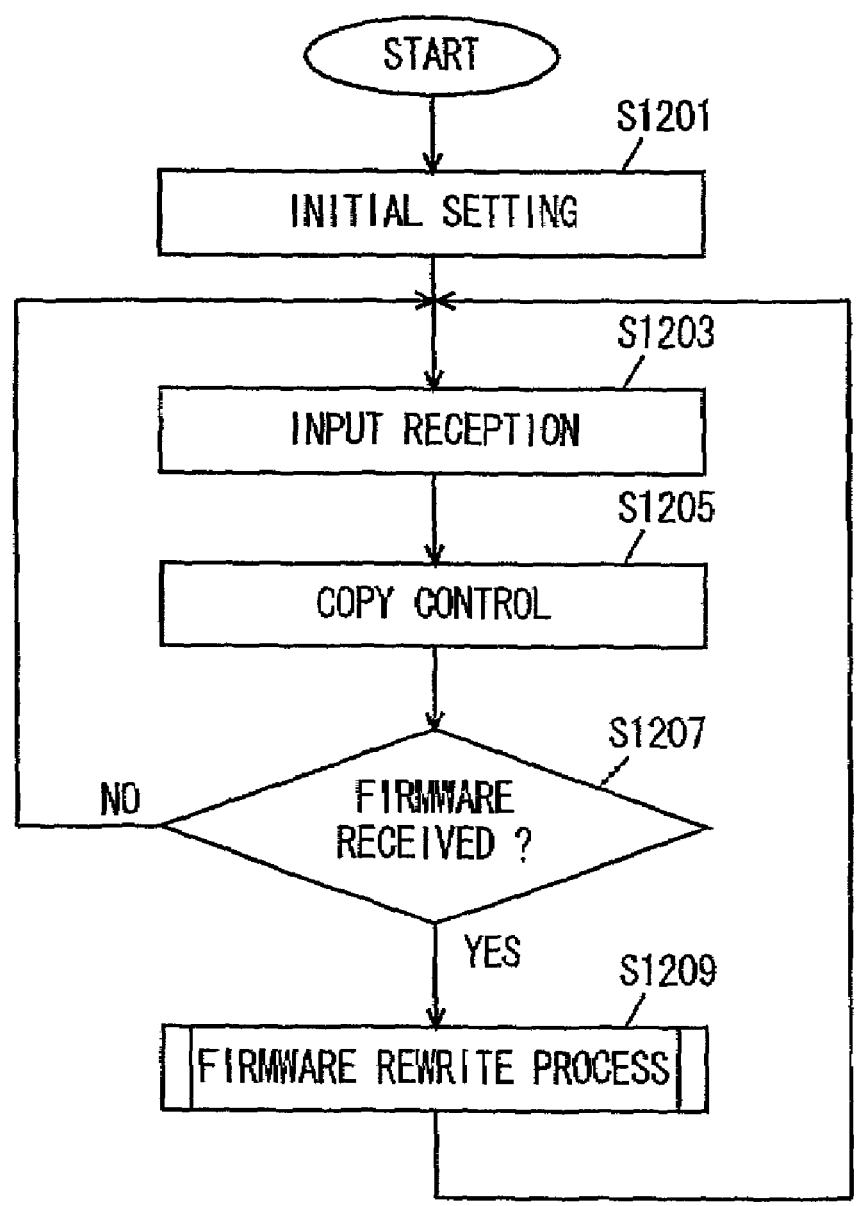
FIG. 19 is a flow chart of the basic process of an image formation apparatus.
Figure 20:
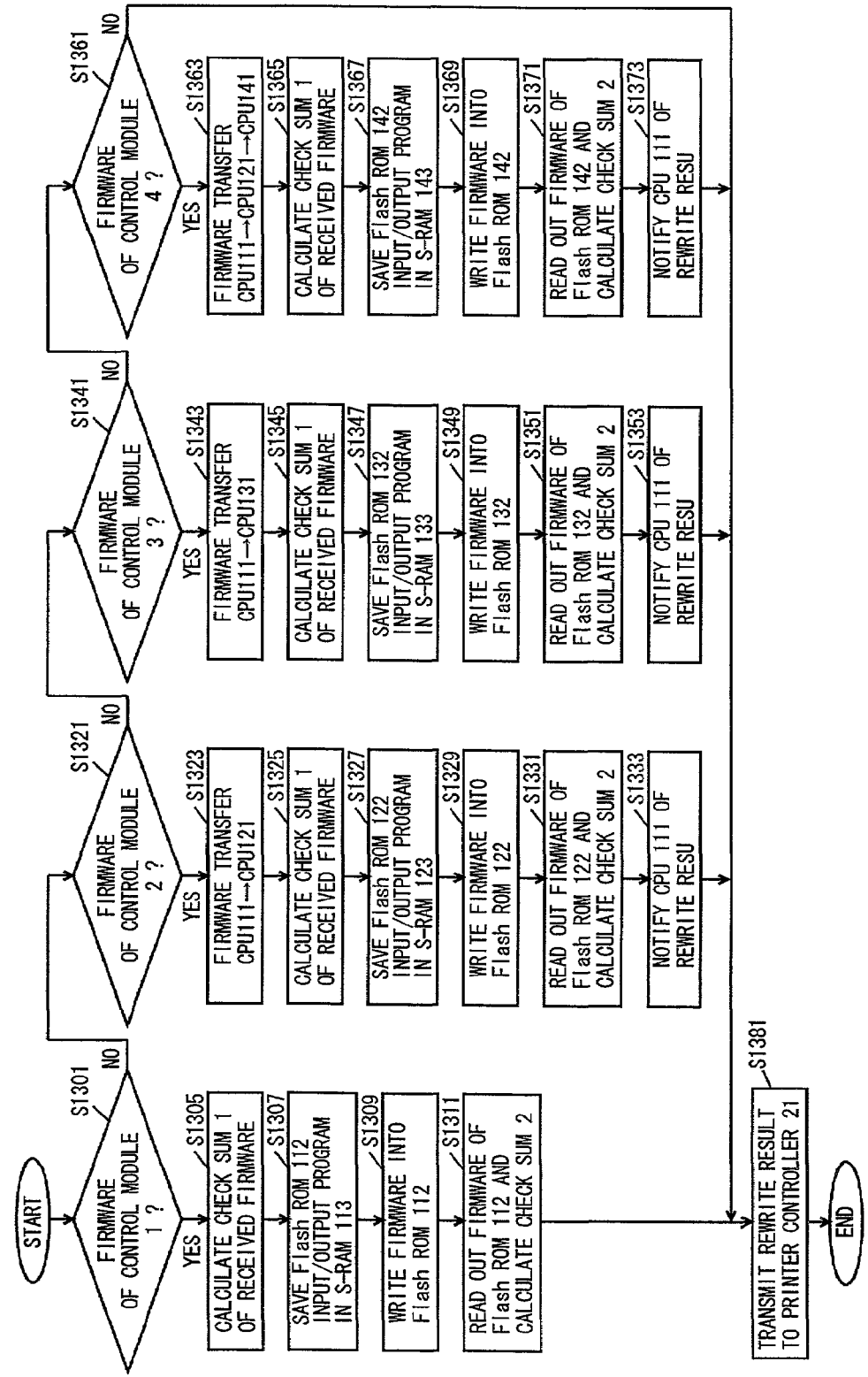
FIG. 20 is a flow chart of the details of a firmware rewrite process (step S1209 of FIG. 12) of image formation apparatus 11.

FIG. 20 is a flow chart of the details of the firmware rewrite process at image formation apparatus 11 (step S1209 of FIG. 19). Referring to FIG. 20, determination is made of which of control modules 1–4 the received firmware corresponds to by steps S1301, S1321, S1341 and S1361.

When determination is made that the firmware corresponds to control module 1 (YES at step S1301), control proceeds to step S1305 where a check sum 1 of the received firmware is calculated and stored in S-RAM 113.

At step S1307, the input/output program for flash ROM 112 is saved in S-RAM 113. At step S1309, the firmware is rewritten into flash ROM 112 using the saved input/output program.

When writing of flash ROM 112 ends, control proceeds to step S1311 where the contents of rewritten flash ROM 112 is read out, and a check sum 2 is calculated. The calculated check sum 2 is compared to check sum 1 stored in S-RAM 113. Determination is made that rewriting has succeeded when the sum match each other and failed when the sum do not match. At step S1381, the determination result is transmitted to printer controller 21 via serial I/F 117, and the firmware rewrite process ends.

When determination is made that the received firmware corresponds to control module 2 (YES at step S1321), control proceeds to step S1323 where the firmware is transferred from CPU 111 to CPU 121 of control module 2. At step S1325, check sum 1 of the received firmware is calculated and stored in S-RAM 123.

At step S1327, the input/output program for flash ROM 122 is saved in S-RAM 123. At step S1329, the firmware is written into flash ROM 122 using the saved input/output program.

When writing of flash ROM 122 ends, control proceeds to step S1331 where the contents of rewritten flash ROM 122 is read out, and check sum 2 is calculated. The calculated check sum 2 is compared to check sum 1 stored in S-RAM 123. Determination is made that rewriting has succeeded when both sum match each other and rewriting has failed when they do not match.

At step S1333, the determination result is notified by CPU 121 to CPU 111. Then, control proceeds to step S1381.

When determination is made that the received firmware corresponds to control module 3 (YES at step S1341), control proceeds to step S1343 where the firmware is transferred from CPU 111 to CPU 131 of control module 3. At step S1345, check sum 1 of the received firmware is calculated and stored in S-RAM 133.

At step S1347, the input/output program for flash ROM 132 is saved in S-RAM 133. At step S1349, the firmware is written into flash ROM 132 using the saved input/output program.

When writing of flash ROM 132 ends, control proceeds to step S1351 where the contents of rewritten flash ROM 132 is read out, and check sum 2 is calculated. This check sum 2 is compared to check sum 1 stored in S-RAM 133. Determination is made that rewriting has succeeded when the values match, and failed when the value do not match.

At step S1353, the determination result is notified by CPU 131 to CPU 111. Then, control proceeds to step S1381.

When determination is made that the received firmware corresponds to control module 4 (YES at step S1361), control proceeds to step S1363 where the firmware is passed from CPU 111 to CPU 121 to be transferred to CP1141 of control module 4. At step S1365, check sum 1 of the received firmware is calculated and stored in S-RAM 143.

At step S1367, the input/output program for flash ROM 142 is saved in S-RAM 143. At step S1369, the firmware is written into flash ROM 142 using the saved input/output program.

When writing into flash ROM 142 ends, control proceeds to step S1371 where the contents of rewritten flash ROM 142 is read out and check sum 2 is calculated. Check sum 2 is compared to check sum 1 stored in S-RAM 143. Determination is made that rewriting has succeeded when the values match each other, and failed when they do not match.

At step S1373, the determination result is notified by CPU 1341 to CPU 111. Then, control proceeds to step S1381.

At step S1381, the rewrite result to the flash ROM of the control module that is the subject of rewriting is transmitted via through I/F 117 to printer controller 21. Thus, the firmware rewrite process ends.

The firmware rewrite process for an image formation apparatus (image formation apparatuses 12, 13 and 14 in FIG. 15) connected to the LAN identical to that of image formation apparatus 11 and receiving firmware from image formation apparatus 11 will be described hereinafter. The flow of the main process is similar to the flow of the process of image formation apparatus 11 shown in FIG. 19. It is to be noted that the contents of the firmware rewrite process slightly differs (step S1209 of FIG. 19). Specifically, the firmware rewrite result (succeed/fail) is transmitted to printer controller 21 since image formation apparatus 11 determines whether or not to transmit firmware to another image formation apparatus. Since the other image formation apparatus does not have to report the rewrite result of the received firmware, determination of success/failure is not made here.

The firmware rewrite process for the image formation apparatus receiving firmware from image formation apparatus 11 (step S1209 of FIG. 19) corresponds to that shown in FIG. 14. The entire structure of each of image formation apparatuses 12, 13 and 14 is similar to that of image formation apparatus 11.

According to the system of the present embodiment, the firmware is not transmitted individually to all target image formation apparatuses even in the case where the firmware of a plurality of image formation apparatuses of the same machine type possessed by the same one user is to be rewritten simultaneously. Therefore, the traffic of the Internet and the LAN at both the service center side and user side will not be increased more than necessary. Also, the load on the mail server at the service center side and user side can be alleviated.

The present embodiment was described corresponding to the case where an IP address is registered in the transfer destination address registration process (step S905 of FIG. 12) carried out by printer controller 21. The network address is not limited to an IP address, and may be an electronic mail address.

In this case, the electronic mail address of another image formation apparatus is registered in the transfer destination address registration process. Therefore, in the transfer destination information table of FIG. 17, an electronic mail address is registered instead of an IP address. Printer controller 21 stores, not the received firmware, but the electronic mail per se downloaded from mail server 33 at step S1119 of FIG. 18.

At step S1133, the electronic mail address of the image formation apparatus that is the transfer destination is read out from the transfer destination information table, and the TCP connection with mail server 33 is established. At step S1137, the electronic mail stored in SRAM 203 has the value in "To" field altered to the read out electronic mail address, and is transmitted to mail server 33.

Thus, electronic mail with firmware attached can be transmitted instead of the firmware per se to another image formation apparatus. In the case where firmware is directly transmitted/received, rewriting can be effected readily and promptly. In the case where electronic mail is used, the firmware can be transmitted/received at an appropriate timing for the transmitter and receiver sides.

In the case where firmware is transmitted via a network such as the LAN towards the Internet protocol address (IP address) of the data communication apparatus that is the transfer destination, firmware can be directly rewritten at the data communication apparatus destination. Thus, the rewriting process can be effected readily and promptly.

As described with reference to FIG. 14, the another image formation apparatus receiving firmware from the parent apparatus (image formation apparatus 11) does not transmit the firmware rewrite result to each printer controller. However, determination can be made of whether rewriting has succeeded/failed and send the result to an appropriate printer controller, similar to the process of image formation apparatus 11 (FIG. 20). Accordingly, the parent apparatus is notified of rewriting failure to allow retransmission. Appropriate subsequent processes can be taken.

The present invention is described based on an image formation apparatus as the data communication apparatus having firmware that is to be rewritten. However, the present invention is not limited thereto. The present invention is applicable to any device that has communication capability and connected to the LAN such as a hub or router.

The firmware communication method (data communication method) carried out by image formation apparatus 11 and printer controller 21 is realized by a program directed to performing the above-described series of process. The data communication program may be installed in advance in the hard disk of image formation apparatus 11 and printer controller 21. Alternatively, the data communication program may be recorded onto a detachable recording medium such as a CD-ROM or magnetic tape. In any case, the data communication program is recorded in a computer-readable recording medium.

The computer-readable recording medium includes a tape type such as a magnetic tape or cassette tape, a disk type such as a magnetic disk (flexible disk, hard disk device and the like) or an optical disk (CD-ROM/magneto optical disk/DVD and the like), a card type such as an IC card (including memory card) or optical card, or a medium that retains a program in a non-volatile manner such as a semiconductor memory, for example, a ROM, EPROM, EEPROM, flash ROM.

The content stored in the recording medium is not limited to a program, and may be data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program product on a computer readable media having instructions for data communication to cause a computer to execute:
    a registration step of registering an address and predetermined information of a plurality of devices for performing data communication via a first network on a memory in correspondence with each device,
    an acquirement step of acquiring electronic mail with firmware sent via a second network,
    a first storage step of storing said acquired electronic mail,
    a first derive step of deriving the firmware from said stored electronic mail,
    a second derive step of deriving information to identify a device from said stored electronic mail,
    an identification step of referring to said memory based on the information derived at said second derive step to identify a plurality of target devices from said plurality of devices, and
    a first transmission step of transmitting said derived firmware to said identified devices via the first network.

2. The data communication program product according to claim 1, further causing the computer to execute:
    a second transmission step of transmitting via said first network said derived firmware to one of the plurality of devices identified at said identification step,
    a write result reception step of receiving via the first network a write result of firmware from said one device to which firmware was transmitted by said first transmission step, and
    a third transmission step of transmitting said derived firmware to a second device among said plurality of identified devices only when said received write result indicates success.

3. The data communication program product according to claim 1, further causing the computer to execute:
    a second storage step of storing one or more of said derived electronic mail,
    a third derive step of deriving a plurality of firmware from said stored one or more electronic mail,
    a second transmission step of transmitting via said first network said derived plurality of firmware to one of the plurality of devices identified at said identification step,
    a write result reception step of receiving via said first network a write result of a plurality of firmware from said one device to which firmware was transmitted at said first transmission step, and
    a third transmission step of transmitting said derived firmware to a second device only when said received write result of a plurality of firmware all indicate success.

4. The data communication program product according to claim 1, wherein said predetermined information of a device registered on said memory, and said information to identify a device derived by said second derive step both include machine type information of a device,
    wherein said identification step identifies said target device by searching for the machine type information of a device that matches the machine type information of a device derived at said second derive step from said memory.

5. The data communication program product according to claim 1, wherein said first network includes a local area network, and said second network includes an Internet.

6. The data communication program product according to claim 1, wherein said device includes an image formation apparatus.

7. A computer-readable recording medium in which is recorded a data communication program defined in claim 1.

8. A data communication apparatus for performing data communication via a first network with a plurality of devices connected to said first network, comprising:
    a registration portion for registering an address and predetermined information of each of said plurality of devices on a memory in correspondence with each device,
    an acquirement portion for acquiring electronic mail with firmware addressed to the data communication apparatus, sent via a second network,
    a storage unit storing said acquired electronic mail,
    a first derive portion for deriving the firmware from said stored electronic mail, a second derive portion for deriving information to identify a device from said stored electronic mail, an identification portion for referring to said memory based on information derived by said second derive portion to identify a plurality of target devices from said plurality of devices, and a transmission portion for transmitting via said first network said derived firmware to said identified device.

9. The data communication apparatus according to claim 8, further comprising:

a write result reception portion, wherein the transmission portion transmits via said first network said derived firmware to one of the plurality of devices identified by said identification portion, the write result reception portion receives via said first network a write result of firmware from said one device to which firmware was transmitted by said first transmission portion, and the transmission portion transmits said derived firmware to a second device among said plurality of identified devices only when said received write result indicates success.

10. The data communication apparatus according to claim 8, further comprising:

a write result reception portion, wherein the storage unit stores one or more of said derived electronic mail, the first derive portion derives a plurality of firmware from said stored one or more electronic mail, the transmission portion transmits via said first network said derived plurality of firmware to one of said plurality of devices identified by said identification unit, the write result reception portion receives via said first network a write result of a plurality of firmware from said one device to which firmware was transmitted by said first transmission portion, and the transmission portion transmits said derived firmware to a second device only when said received write result of a plurality of firmware all indicate success.

11. A data communication method that allows data communication via a first network with a plurality of devices connected to said first network, comprising:

a registration step of registering an address and predetermined information of a plurality of devices on a memory in correspondence with each device, an acquirement step of acquiring electronic mail with firmware addressed to itself, sent via a second network, a storage step of storing said acquired electronic mail, a first derive step of deriving the firmware from said stored electronic mail, a second derive step of deriving information to identify a device from said stored electronic mail, an identification step of referring to said memory based on the information derived at said second derive step to identify a plurality of target devices from said plurality of devices, and a transmission step of transmitting said derived firmware to said identified devices via the first network.

12. The data communication method according to claim 11, further comprising:

a second transmission step of transmitting via said first network said derived firmware to one of the plurality of devices identified at said identification step, a write result reception step of receiving via the first network a write result of firmware from said one device to which firmware was transmitted by said first transmission step, and a third transmission step of transmitting said derived firmware to a second device among said plurality of identified devices only when said received write result indicates success.

13. The data communication method according to claim 11, further comprising:

a storage step of storing one or more of said derived electronic mail, a first derive step of deriving a plurality of firmware from said stored one or more electronic mail, a first transmission step of transmitting via said first network said derived plurality of firmware to one of the plurality of devices identified at said identification step, a write result reception step of receiving via said first network a write result of a plurality of firmware from said one device to which firmware was transmitted at said first transmission step, and a second transmission step of transmitting said derived firmware to a second device only when said received write result of a plurality of firmware all indicate success.

14. A program product on a computer readable media having instructions for data communication to cause a computer to execute:

a registration step of registering a network address of a plurality of data communication apparatuses connected to a first network, an acquirement step of acquiring electronic mail with firmware attached, sent via a second network, a derive step of deriving said attached firmware from said acquired electronic mail, a write step of writing said derived firmware into a memory that is a subject of rewriting, and a transmission step of transmitting via said first network said attached firmware towards said registered network address of a plurality of data communication apparatuses.

15. The data communication program product according to claim 14, further causing the computer to execute:

a determination step of determining whether writing to a memory by said write step has succeeded or not, wherein said transmission step carries out transmission when determination is made of success by said determination step.

16. The data communication program product according to claim 14, wherein the network address registered at said registration step is an Internet protocol address, wherein said transmission step transmits said derived firmware towards said registered Internet protocol address.

17. The data communication program product according to claim 14, wherein the network address registered at said registration step is an electronic mail address, wherein said transmission step transmits said firmware by transmitting said acquired electronic mail towards said registered electronic mail address.

18. A program product on a computer readable media having instructions for data communication causing a computer to execute:

a registration step of registering a network address of a data communication apparatus connected to a first network, an acquirement step of acquiring electronic mail attached with firmware, sent via a second network, a derive step of deriving said attached firmware from said acquired electronic mail, a transmission step of transmitting said derived firmware to a module that is a subject of rewriting, a reception step of receiving a signal indicating whether writing of said transmitted firmware has succeeded or not, and a transfer step of transferring said derived firmware towards said registered network address of a data communication apparatus via said first network when determination is made based on said signal that writing has succeeded.

19. The data communication program product according to claim 14, wherein said first network includes a local area network, and said second network includes an Internet.

20. The data communication program product according to claim 14, wherein said data communication apparatus includes an image formation apparatus.

21. A computer-readable recording medium in which is recorded a data communication program defined in claim 14.

22. A data communication apparatus comprising:

a registration portion for registering a network address of a plurality of data communication apparatuses connected to a first network, an acquirement portion for acquiring electronic mail with firmware attached, sent via a second network, a derive portion for deriving said attached firmware from said acquired electronic mail, a write portion for writing said derived firmware into a memory that is a subject of rewriting, and a transmission portion for transmitting via said first network said attached firmware towards said registered network address of a plurality of data communication apparatuses.

23. A data communication apparatus comprising:

a registration portion for registering a network address of a data communication apparatus connected to a first network, an acquirement portion for acquiring electronic mail attached with firmware, sent via a second network, a derive portion for deriving said attached firmware from said acquired electronic mail, a transmission portion for transmitting said derived firmware to a module that is a subject of rewriting, a reception portion for receiving a signal indicating whether writing of said transmitted firmware has succeeded or not, and a transfer portion for transferring said derived firmware towards said registered network address of a data communication apparatus via said first network when determination is made based on said signal that writing has succeeded.

24. A data communication method comprising:

a registration step of registering a network address of a plurality of data communication apparatuses connected to a first network, an acquirement step of acquiring electronic mail with firmware attached, sent via a second network, a derive step of deriving said attached firmware from said acquired electronic mail, a write step of writing said derived firmware into a memory that is a subject of rewriting, and a transmission step of transmitting via said first network said attached firmware towards said registered network address of a plurality of data communication apparatuses.

25. A data communication method comprising:

a registration set of registering a network address of a data communication apparatus connected to a first network, an acquirement step of acquiring electronic mail attached with firmware, sent via a second network, a derive step of deriving said attached firmware from said acquired electronic mail, a transmission step of transmitting said derived firmware to a module that is a subject of rewriting, a reception step of receiving a signal indicating whether writing of said transmitted firmware has succeeded or not, and a transfer step of transferring said derived firmware towards said registered network address of a data communication apparatus via said first network when determination is made based on said signal that writing has succeeded.

* * * * *